United States Patent
Ogdon et al.

(10) Patent No.: US 8,244,889 B1
(45) Date of Patent: Aug. 14, 2012

(54) PROVIDING A PRESENTATION ON A NETWORK HAVING A PLURALITY OF SYNCHRONIZED MEDIA TYPES

(75) Inventors: Robert H Ogdon, Littleton, CO (US); Frank E. Johnson, Aurora, IL (US)

(73) Assignee: West Corporation, Omaha, NE (US)

(*) Notice: Subject to any disclaimer, the term of this patent is extended or adjusted under 35 U.S.C. 154(b) by 0 days.

(21) Appl. No.: 13/240,076

(22) Filed: Sep. 22, 2011

Related U.S. Application Data

(63) Continuation of application No. 12/265,961, filed on Nov. 6, 2008, now Pat. No. 8,046,478, which is a continuation of application No. 11/468,485, filed on Aug. 30, 2006, now Pat. No. 7,490,169, which is a continuation of application No. 10/622,358, filed on Jul. 18, 2003, now Pat. No. 7,133,896, which is a continuation of application No. 09/675,527, filed on Sep. 29, 2000, now Pat. No. 6,598,075, which is a continuation of application No. 09/052,862, filed on Mar. 31, 1998, now Pat. No. 6,161,137.

(60) Provisional application No. 60/041,770, filed on Mar. 31, 1997.

(51) Int. Cl.
*G06F 15/16* (2006.01)
(52) U.S. Cl. .......................... 709/229; 709/231; 709/248
(58) Field of Classification Search .................. 709/229, 709/204, 205, 217–219, 231, 248
See application file for complete search history.

(56) References Cited

U.S. PATENT DOCUMENTS

| | | | |
|---|---|---|---|
| 4,360,827 A | 11/1982 | Braun | |
| 4,650,929 A | 3/1987 | Boerger et al. | |
| 4,710,917 A | 12/1987 | Tompkins et al. | |
| 4,712,533 A | 12/1987 | Cruise | |
| 4,796,293 A | 1/1989 | Blinken et al. | |
| 5,003,532 A | 3/1991 | Ashida et al. | |
| 5,113,431 A | 5/1992 | Horn | |
| 5,195,086 A | 3/1993 | Baumgartner et al. | |
| 5,323,445 A | 6/1994 | Nakatsuka | |
| 5,371,534 A | 12/1994 | Dagdeviren et al. | |
| 5,384,771 A | 1/1995 | Isidoro et al. | |

(Continued)

FOREIGN PATENT DOCUMENTS

EP        0723731        12/2002

(Continued)

OTHER PUBLICATIONS

"AT&T Teleconference Services: It's Never Been Easier to Call a Meeting"; AT&T 2002; 2pp.

(Continued)

*Primary Examiner* — Krisna Lim

(57) ABSTRACT

A presentation system and method is disclosed for presenting a presentation via a communications network. The presentation system includes one or more client nodes structured to receive presentation data. One or more leader stations of the presentation is structured to control content of the presentation data at the one or more client nodes, and one or more content server sites is structured to provide the presentation data to the one or more client nodes. The presentation system further includes one or more content managers structured to manage the delivery of the presentation data to the one or more content server sites and verify that the presentation data is operable to being presented at the one or more client nodes.

20 Claims, 9 Drawing Sheets

U.S. PATENT DOCUMENTS

| | | | |
|---|---|---|---|
| 5,408,526 A | 4/1995 | McFarland et al. | |
| 5,418,844 A | 5/1995 | Morrisey et al. | |
| 5,422,893 A | 6/1995 | Gregg et al. | |
| 5,450,123 A | 9/1995 | Smith | |
| 5,473,363 A | 12/1995 | Ng et al. | |
| 5,473,744 A | 12/1995 | Allen et al. | |
| 5,473,772 A | 12/1995 | Halliwell et al. | |
| 5,473,773 A | 12/1995 | Aman et al. | |
| 5,491,517 A | 2/1996 | Kreitman et al. | |
| 5,491,797 A | 2/1996 | Thompson et al. | |
| 5,495,284 A | 2/1996 | Katz | |
| 5,517,253 A | 5/1996 | DeLange | |
| 5,526,037 A | 6/1996 | Cortjens et al. | |
| 5,553,068 A | 9/1996 | Aso et al. | |
| 5,555,017 A | 9/1996 | Landante et al. | |
| 5,557,607 A | 9/1996 | Holden | |
| 5,563,878 A | 10/1996 | Blakeley | |
| 5,568,183 A | 10/1996 | Cortjens et al. | |
| 5,579,028 A | 11/1996 | Takeya | |
| 5,590,127 A | 12/1996 | Bales et al. | |
| 5,594,495 A | 1/1997 | Palmer et al. | |
| 5,594,859 A | 1/1997 | Palmer et al. | |
| 5,606,539 A | 2/1997 | DeHaan | |
| 5,625,410 A | 4/1997 | Washino et al. | |
| 5,642,151 A | 6/1997 | Nusbickel et al. | |
| 5,680,639 A | 10/1997 | Milne et al. | |
| 5,684,918 A | 11/1997 | Abecassis | |
| 5,689,553 A | 11/1997 | Ahuja et al. | |
| 5,717,725 A | 2/1998 | Campana | |
| 5,737,531 A | 4/1998 | Ehley | |
| 5,742,768 A | 4/1998 | Gennaro et al. | |
| 5,758,257 A | 5/1998 | Herz et al. | |
| 5,759,101 A | 6/1998 | Von Kohorn | |
| 5,768,508 A | 6/1998 | Eikeland | |
| 5,768,527 A | 6/1998 | Zhu et al. | |
| 5,774,698 A | 6/1998 | Olnowich | |
| 5,802,530 A | 9/1998 | Van Hoff | |
| 5,805,165 A | 9/1998 | Thorne, III et al. | |
| 5,818,514 A | 10/1998 | Duttweiler et al. | |
| 5,822,525 A | 10/1998 | Tafoya et al. | |
| 5,828,837 A | 10/1998 | Eikeland | |
| 5,828,839 A | 10/1998 | Moncreiff | |
| 5,844,600 A | 12/1998 | Kerr | |
| 5,848,396 A | 12/1998 | Gerace | |
| 5,864,682 A | 1/1999 | Porter et al. | |
| 5,867,494 A | 2/1999 | Krishnaswamy et al. | |
| 5,867,654 A | 2/1999 | Ludwig et al. | |
| 5,884,039 A | 3/1999 | Ludwig et al. | |
| 5,892,946 A | 4/1999 | Woster et al. | |
| 5,894,554 A | 4/1999 | Lowery et al. | |
| 5,897,622 A | 4/1999 | Blinn et al. | |
| 5,912,701 A | 6/1999 | Morton, Jr. et al. | |
| 5,928,330 A | 7/1999 | Goetz et al. | |
| 5,929,848 A | 7/1999 | Albukerk et al. | |
| 5,944,791 A | 8/1999 | Scherpbier | |
| 5,944,795 A | 8/1999 | Civanlar | |
| 5,946,323 A | 8/1999 | Eakins et al. | |
| 5,948,065 A | 9/1999 | Eilert et al. | |
| 5,951,646 A | 9/1999 | Brandon | |
| 5,953,049 A | 9/1999 | Horn et al. | |
| 5,956,716 A | 9/1999 | Kenner et al. | |
| 5,956,729 A | 9/1999 | Goetz et al. | |
| 5,961,602 A | 10/1999 | Thompson et al. | |
| 5,968,119 A | 10/1999 | Stedman et al. | |
| 5,999,525 A | 12/1999 | Krishnaswamy et al. | |
| 6,006,241 A | 12/1999 | Purnaveja et al. | |
| 6,020,915 A | 2/2000 | Bruno et al. | |
| 6,035,336 A | 3/2000 | Lu et al. | |
| 6,038,230 A | 3/2000 | Ofek | |
| 6,038,545 A | 3/2000 | Mandeberg et al. | |
| 6,049,835 A | 4/2000 | Gagnon | |
| 6,052,717 A * | 4/2000 | Reynolds et al. | 709/218 |
| 6,055,513 A | 4/2000 | Katz et al. | |
| 6,061,738 A | 5/2000 | Osaku et al. | |
| 6,081,513 A | 6/2000 | Roy | |
| 6,094,212 A | 7/2000 | Imaeda | |
| 6,108,687 A | 8/2000 | Craig | |
| 6,108,703 A | 8/2000 | Leighton et al. | |
| 6,108,704 A | 8/2000 | Hutton et al. | |
| 6,119,164 A | 9/2000 | Basche | |
| 6,124,880 A | 9/2000 | Shafiee | |
| 6,128,033 A | 10/2000 | Friedel et al. | |
| 6,141,666 A | 10/2000 | Tobin | |
| 6,151,619 A | 11/2000 | Riddle | |
| 6,154,465 A | 11/2000 | Pickett | |
| 6,161,137 A | 12/2000 | Ogdon et al. | |
| 6,166,735 A | 12/2000 | Dom et al. | |
| 6,173,326 B1 | 1/2001 | Collins | |
| 6,181,694 B1 | 1/2001 | Pickett | |
| 6,184,937 B1 | 2/2001 | Williams et al. | |
| 6,195,680 B1 | 2/2001 | Goldszmidt et al. | |
| 6,195,684 B1 | 2/2001 | Watanabe et al. | |
| 6,199,076 B1 | 3/2001 | Logan et al. | |
| 6,199,104 B1 | 3/2001 | Delph | |
| 6,205,209 B1 | 3/2001 | Goldberg et al. | |
| 6,205,485 B1 | 3/2001 | Kikinis | |
| 6,226,681 B1 | 5/2001 | Koga et al. | |
| 6,237,025 B1 | 5/2001 | Ludwig et al. | |
| 6,246,679 B1 | 6/2001 | Yamamoto | |
| 6,262,978 B1 | 7/2001 | Bruno et al. | |
| 6,266,340 B1 | 7/2001 | Pickett et al. | |
| 6,286,034 B1 | 9/2001 | Sato et al. | |
| 6,292,482 B2 | 9/2001 | Pickett | |
| 6,298,045 B1 | 10/2001 | Pang et al. | |
| 6,301,339 B1 | 10/2001 | Staples et al. | |
| 6,335,927 B1 | 1/2002 | Elliott et al. | |
| 6,339,842 B1 | 1/2002 | Fernandez et al. | |
| 6,343,074 B1 | 1/2002 | Pickett | |
| 6,343,314 B1 | 1/2002 | Ludwig et al. | |
| 6,347,075 B1 | 2/2002 | Barzegar et al. | |
| 6,351,762 B1 | 2/2002 | Ludwig et al. | |
| 6,366,578 B1 | 4/2002 | Johnson | |
| 6,377,025 B1 | 4/2002 | Wu | |
| 6,389,009 B1 | 5/2002 | Pickett | |
| 6,408,336 B1 | 6/2002 | Schneider et al. | |
| 6,415,326 B1 | 7/2002 | Gupta | |
| 6,427,002 B2 | 7/2002 | Campbell et al. | |
| 6,430,176 B1 | 8/2002 | Christie, IV | |
| 6,437,818 B1 | 8/2002 | Ludwig et al. | |
| 6,442,169 B1 | 8/2002 | Lewis | |
| 6,442,598 B1 | 8/2002 | Wright et al. | |
| 6,445,682 B1 | 9/2002 | Weitz | |
| 6,449,284 B1 | 9/2002 | Hagirahim | |
| 6,456,594 B1 | 9/2002 | Kaplan et al. | |
| 6,473,404 B1 | 10/2002 | Kaplan et al. | |
| 6,477,708 B1 | 11/2002 | Sawa | |
| 6,484,196 B1 | 11/2002 | Maurille | |
| 6,493,353 B2 | 12/2002 | Kelly et al. | |
| 6,493,748 B1 | 12/2002 | Nakayama et al. | |
| 6,493,763 B1 | 12/2002 | Suzuki | |
| 6,496,567 B1 | 12/2002 | Bjornberg et al. | |
| 6,529,502 B2 | 3/2003 | Sarkissian et al. | |
| 6,539,087 B1 | 3/2003 | Walsh et al. | |
| 6,560,222 B1 | 5/2003 | Pounds et al. | |
| 6,577,605 B1 | 6/2003 | Dagate et al. | |
| 6,583,806 B2 | 6/2003 | Ludwig et al. | |
| 6,590,602 B1 | 7/2003 | Fernandez et al. | |
| 6,594,688 B2 | 7/2003 | Ludwig et al. | |
| 6,598,075 B1 | 7/2003 | Ogdon et al. | |
| 6,614,781 B1 | 9/2003 | Elliott et al. | |
| 6,621,802 B1 | 9/2003 | Johansson | |
| 6,621,834 B1 | 9/2003 | Scherpbier et al. | |
| 6,625,130 B2 | 9/2003 | Fielding | |
| 6,631,410 B1 | 10/2003 | Kowalski et al. | |
| 6,637,032 B1 * | 10/2003 | Feinleib | 725/110 |
| 6,647,111 B1 | 11/2003 | Bjornberg et al. | |
| 6,650,745 B1 | 11/2003 | Bauer et al. | |
| 6,684,403 B1 | 1/2004 | Barraud | |
| 6,690,654 B2 | 2/2004 | Elliott et al. | |
| 6,693,661 B1 | 2/2004 | Vanderwilt et al. | |
| 7,143,177 B1 | 11/2006 | Johnson | |
| 7,165,213 B1 | 1/2007 | Busey | |
| 7,412,533 B1 | 8/2008 | Johnson et al. | |
| 2001/0003828 A1 | 6/2001 | Peterson et al. | |
| 2001/0052009 A1 | 12/2001 | Desai et al. | |
| 2002/0075411 A1 | 6/2002 | Nguyen | |

FOREIGN PATENT DOCUMENTS

| WO | 9510918 | 4/1995 |
|---|---|---|
| WO | 97/22201 | 6/1997 |
| WO | 9722201 | 6/1997 |
| WO | 9732251 | 9/1997 |
| WO | 97/42582 | 11/1997 |
| WO | 9742582 | 11/1997 |
| WO | 9821664 | 5/1998 |
| WO | 98/44733 | 10/1998 |
| WO | 01/74024 A2 | 10/2001 |
| WO | 0174024 A2 | 10/2001 |

OTHER PUBLICATIONS

Gibbon et al.; "The Use of Network Delay Estimation for Multimedia Data Retrieval"; Multimedia Communications Laboratory, Department of Electrical and Computer Engineering, Boston University, Boston, Massachusetts 02215; MCL Technical Report Jun. 15, 1996; 29pp.

MCL Paper Abstracts; Ahanger; "Techniques for Automatic Digital Video Composition"; Department of Electrical and Computer Engineering, Boston University; Dec. 11, 1998.

MCL Paper Abstracts; Ahanger et al.; "A Language to Support Automatic Composition of Newscasts"; Journal of Computer Information Technology; vol. 6, No. 3; 1998.

MCL Paper Abstracts; Ahanger et al.; "A Survey of Technologies for Parsing and Indexing Digital Video"; Journal of Visual Communication and Image Representation; vol. 7, No. 1; Mar. 1996; pp. 28-43.

MCL Paper Abstracts; Ahanger et al.; "A System for Customized News Delivery from Video Archives"; Proc. 4th Intl. Conf. on Multimedia Computing and Systems; Jun. 1997, pp. 526-533.

MCL Paper Abstracts; Ahanger et al.; "Automatic Composition Techniques for Video Production"; IEEE Trans. on Knowledge and Data Engineering; vol. 10, No. 6, 1998.

MCL Paper Abstracts; Ahanger et al.; "Automatic Digital Video Production Concepts"; Handbook on Internet and Multimedia Systems and Applications, CRC Press, Boca Raton; Dec. 1998.

MCL Paper Abstracts; Ahanger et al.; "Data Semantics for Improving Retrieval Performance of Digital News Video Systems"; Proc. 8th IFIP w.y Working Conference on Database Semantics, Rotorua, New Zealand; Jan. 1999.

MCL Paper Abstracts; Ahanger et al.; "Easy Ed: An Integration of Technologies for Multimedia Education"; Proc. of WebNet '97; Oct. 1997.

MCL Paper Abstracts; Ahanger et al.; "Video Query Formulation"; Proc. IS&T/SPIE Symposium on Electronic Imaging Science and Technology; Feb. 1995; pp. 280-291.

MCL Paper Abstracts; Basu et al.; "An Implementation of Dynamic Service Aggregation for interactive Video Delivery"; Proc. SPIE—Multimedia Computing and Networking; Jan. 1998.

MCL Paper Abstracts; Basu et al.; "Optimal Stream Clustering Problems in Video-on-Demand"; Proc. Parallel and Distributed Computing and Systems; Oct. 1998.

MCL Paper Abstracts; Basu et al.; "Scheduling of Secondary Content for Aggregation in Commercial Video-on-Demand Systems"; MCL Technical Report; Dec. 16, 1998.

MCL Paper Abstracts; Boucher et al.; "Design and Performance of a Multi-Stream MPEG-1 System Layer Encoder/Player Set"; Proc. IS&T/SPIE Symposium on Electronic Imaging Science and Technology; Feb. 1995; pp. 435-446.

MCL Paper Abstracts; Carrer; Environment for the Annotation of Video of Video Information via Metadata Collection and Management; Thesis, Department of Electronics and Informatics; Mar. 1996.

MCL Paper Abstracts; Carrer et al.; "An Annotation Engine for Supporting Video Database Population"; Multimedia Tools and Applications; vol. 5, No. 3; Nov. 1997; pp. 233-258.

MCL Paper Abstracts; Carreira et al.; "Capture-Time Indexing Paradigm, Authoring Took, and Browsing Environment for Digital Broadcast Video"; Proc. IS&T/SPIE Symposium on Electronic Imaging Science and Technology; Feb. 1995; 380-388.

MCL Paper Abstracts; Chen; "A Disk Scheduling Scheme and MPEG Data Layout Policy for Interactive Video Access from a Single Disk Storage Device"; Dept. of Electrical, Computer and Systems Engineering, Boston University; Aug. 24, 1995.

MCL Paper Abstracts; Chen et al.; "A Prototype VOD Server to Support Many Concurrent MPEG Streams Using a Novel Disk Scheduling Strategy"; Multimedia Communications Laboratory Report; Aug. 20, 1995.

MCL Paper Abstracts; Chen et al.; "A Scalable Video-on-Demand Service for the Provision of VCR-Like Functions"; Proc. 2nd Intl. Conf. on Multimedia Computing Systems; May 1995; pp. 65-72.

MCL Paper Abstracts; Chen et al.; "A Storage and Retrieval Technique for Scalable Delivery of MPEG-Encoded Video"; Journal of Parallel and Distributed Computing; vol. 30, No. 2; Nov. 1995; pp. 180-189.

MCL Paper Abstracts; Chen et al.; "Physical Storage Organizations for Time-Dependent Multimedia Data"; Proc. 4th Intl. Conf. on Foundations of Data Organization and Algorithms; Oct. 1993; pp. 19-34.

MCL Paper Abstracts; Chen et al.; "Storage Allocation Policies for Time-Dependent Multimedia Data"; IEEE Trans. on Knowledge and Data Engineering; 1996.

MCL Paper Abstracts; Deardorff et al.; "Video Scene Decomposition with the Motion Picture Parser"; SPIE; Feb. 1994; vol. 2187; pp. 44-55.

MCL Paper Abstracts; Gibbon; "Real-Time Scheduling for Multimedia Services Using Network Delay Estimation"; Dept. of Electrical, Computer and Systems Engineering, Boston University; 1994.

MCL Paper Abstracts; Gibbon et al.; "Real-Time Data Delivery for Multimedia Networks"; Proc. 18th Annual Conf. on Local Computer Networks; Sep. 1993; pp. 7-16.

MCL Paper Abstracts; Gibbon et al.; "Use of Network Delay Estimation for Multimedia Data Retrieval"; IEEE Journal on Selected Areas in Communications; vol. 14, No. 7, Sep. 1996; pp. 1376-1387.

MCL Paper Abstracts; Krishnamurthy; "A Dynamic Resource Reservation and Pricing Policy for Scalable Video Delivery"; Dept. of Electrical, Computer and Systems Engineering, Boston University; Sep. 22, 1995.

MCL Paper Abstracts; Krishnamurthy; "An ATM LAN for Multimedia Traffic"; Masters Thesis, Dept. Electrical, Computer and Systems Engineering; Boston University; Aug. 1992.

MCL Paper Abstracts; Krishnamurthy et al.; "A Pricing Policy for Scalable VOD Applications"; Multimedia Systems; 1996.

MCL Paper Abstracts; Krishnamurthy et al.; "A Pricing Policy for Scalable VOD Applications"; Proc. 2nd IEEE Intl. Workshop on Community Networking Integrated Multimedia Services to the Home; Jun. 1995; pp. 139-146.

MCL Paper Abstracts; Krishnamurthy et al.; "Connection-Oriented Service Renegotiation for Scalable Video Delivery"; Proc. 1st IEEE Intl. Conf. Multimedia Computing and Systems; May 1994; pp. 502-507.

MCL Paper Abstracts; Krishnan et al.; A Failure and Overload Tolerance Mechanism for Continuous Media Servers; Proc. ACM Multimedia; Nov. 1997.

MCL Paper Abstracts; Krishnan et al.; "Service Aggregation Through Rate Adaptation Using a Single Storage Format"; Proc. 7th Intl. Workshop on Network and Operating System Support for Digital Audio and Video; May 1997.

MCL Paper Abstracts; Ligresti; "Environment for Capture, Analysis, and Annotation of Video Information"; Thesis, Department of Electronics and Informatics; Mar. 1996.

MCL Paper Abstracts; Little; "A Framework for Synchronous Delivery of Time-Dependent Multimedia Data"; Multimedia Systems; 1993; pp. 175-200.

MCL Paper Abstracts; Little; "Protocols for Bandwidth-Constrained Multimedia Traffic"; Proc. 4th IEEE COMSOC Intl. Workshop on Multimedia Communications; Apr. 1992; pp. 150-159.

MCL Paper Abstracts; Little; "Time-Based Media Representation and Delivery in Multimedia Systems"; ACM Press; Mar. 1994; pp. 175-200.

MCL Paper Abstracts; Little et al.; "A Digital Video-on-Demand Service Supporting Content-Based Queries"; Proc. ACM Multimedia; Aug. 1993; pp. 427-436.

MCL Paper Abstracts; Little et al.; "An Intermedia Skew Control System for Multimedia Data Presentation"; Proc. 3rd Intl. Workshop on Network and Operating System Support for Digital Audio and Video; vol. 712; Dec. 1993.

MCL Paper Abstracts; Little et al.; "Client-Server Metadata Management for the Delivery of Movies on a Video-On-Demand System"; Proc. 1st International Workshop on Services in Distributed and Networked Environments; Jun. 1994; pp. 11-18.

MCL Paper Abstracts; Little et al.; "Interval-Based Temporal Models for Time-Dependent Multimedia Data"; IEEE on Data and Knowledge Engineering; vol. 5, No. 4; Aug. 1993; pp. 551-563.

MCL Paper Abstracts; Little et al.; "Multimedia Synchronization"; IEEE Data Engineering Bulletin; vol. 14, No. 3, Sep. 1991; pp. 26-35.

MCL Paper Abstracts; Little et al.; "Multimedia Synchronization Protocols for Broadband Integrated Services"; IEEE Journal on Selected Areas in Communications; vol. 9, No. 9, Dec. 1991; pp. 1368-1382.

MCL Paper Abstracts; Little et al.; "Popularity-Based Assignment of Movies to Storage Devices in a Video-on-Demand System"; Multimedia Systems; vol. 2, No. 6; Jan. 1995; pp. 280-287.

MCL Paper Abstracts; Little et al.; "Prospects for Interactive Video-on-Demand"; IEEE Multimedia; vol. 1, No. 3; Fall 1994; pp. 14-24.

MCL Paper Abstracts; Little et al.; "Scheduling of Bandwidth-Constrained Multimedia Traffic"; Computer Communications; vol. 15, No. 5; Jul./Aug. 1992; pp. 381-387.

MCL Paper Abstracts; Little et al.; "Selection and Dissemination of Information via the Virtual Video Browser"; Journal of Multimedia Tools and Applications; vol. 1, No. 2; Jun. 1995; pp. 149-172.

MCL Paper Abstracts; Little et al.; Spatio-Temporal Composition of Distributed Multimedia Objects for Value-Added Networks; Computer; vol. 24, No. 10, Oct. 1991, pp. 42-50.

MCL Paper Abstracts; Little et al.; "Synchronization and Storage Models for Multimedia Objects"; IEEE Journal on Selected Areas in Communications; vol. 8, No. 3; Apr. 1990; pp. 413-427.

MCL Paper Abstracts; Little et al.; "The Use of Multimedia Technology in Distance Learning"; MyNet '95; Sep. 1995; pp. 3-17.

MCL Paper Abstracts; Perez-Luque; "A Temporal Reference Framework for Multimedia Synchronization Techniques"; Department of Signals, Systems, and Radiocommunications, Universidad Politecnica de Madrid; Oct. 11, 1995.

MCL Paper Abstracts; Perez-Luque et al.; "A Temporal Reference Framework for Multimedia Synchronization"; IEEE Journal on Selected Areas in Communications; vol. 14, No. 1; Jan. 1996; pp. 36-51.

MCL Paper Abstracts; Perez-Luque et al.; "Temporal Models for Multimedia Synchronization"; Proc. Interactive Multimedia over Networks; Jul. 1994.

MCL Paper Abstracts; Venkatesh et al.; "A Model for Evaluating the Cost-Performance Characteristics of Single Disk Storage Systems for Supporting Digital Video Content"; Proc. 6th Intl. Workshop on Network and Operating System Support for Digital Audio and Video; Apr. 1996; pp. 139-146.

MCL Paper Abstracts; Venkatesh et al.; "Dynamic Service Aggregation for Efficient Use of Resources in Interactive Video Delivery"; Proc. of the 5th Intl. Workshop on Network on Operating System Support for Digital Audio and Video; Nov. 1995, pp. 113-116.

MCL Paper Abstracts; Venkatesh et al.; "Intestigation of Web Server Access as a Basis for Designing Video-on-Demand Systems"; Proc. 1st Intl. Symposium on Photonics Technologies and Systems for Voice, Video, and Data Communications; Oct. 1995; vol. 2617-06.

MCL Paper Abstracts; Venkatesh et al.; "The Use of Media Characteristics and User Behavior for the Design of Multimedia Servers"; Multimedia Information Storage and Management, Kluwar Academic Publishers; 1996; pp. 95-116.

MCL Paper Abstracts; Wittenburg et al.; "An Adaptive Document Management System for Shared Multimedia Data"; Proc. 1st IEEE Intl. Conf. on Multimedia Computing and Systems; May 1994; pp. 245-254.

Michel; "Synchronized Multimedia"; W3C Multimedia Activity; Dec. 13, 2000.

Sandsta et al.; "Video Server on an ATM Connected Cluster of Workstations"; Department of Computer and Information Science, Norwegian University of Science and Technology, N-7034 Trondheim, Norway; Nov. 1997; pp. 1-18.

Anonymous, "Putting the Magic in Multimedia"; Computer Design; v30, n12, p. 31, Sep. 1991.

Adjeroh et al.; "Synchronization Mechanisms for Distributed Multimedia Presentation Systems"; IEEE, pp. 30-37, 1995.

* cited by examiner

| | SCRIPT LEVEL 612 | ITEM # 616 | VIRTUAL TIME HR:MIN:SEC 620 | ACTION 624 | RESOURCE TYPE 632 | RESOURCE LOCATION 636 | RESOURCE NAME 640 |
|---|---|---|---|---|---|---|---|
| 608a | 1 | 1 | 0.00 | Client_Load | FTP File | Server Name (SN) | Path + File * |
| 608b | 2 | | | | FTP Dir | Server Name | Path |
| 608c | 3 | | | client_Free | FTP File | "TWFTP" | File |
| 608d | 1,2 | | | client_Display | HTML_File | SN | TWFTP | CD | LOCAL | Path + File | File * |
| 608e | 1,3 | 2 | 1:01.00 | | MC_Question | SN | TWFTP | CD | LOCAL | Path + File | File * |
| 608f | 2,3 | | | | MC_Answer | SN | TWFTP | CD | LOCAL | Path + File | File * |
| 608g | 1,2,3 | | | | Info_Form | SN | TWFTP | CD | LOCAL | Path + File * |
| 608h | 1,2,3 | | | client_Play | Audio RaFile | Server Name | Path + File |
| 608i | 1,2,3 | | | | Audio RaLive | Server Name | Encoder Task |
| 608j | 1,2,3 | | 0.00 | leader_Hold | | | |
| 608k | 1,2,3 | | | time_Set At | "THIS LINE" | | |
| 608l | 1,2,3 | | | time_Hold_To | | "END" | "GOT" | |
| 608m | 1,2,3 | | | | HTML_File | "END" | |
| 608n | 1,2,3 | | | child_Script | Audio RaFile | "this" | Path + File |
| 608o | 1,2,3 | | | End_Start | TW script | | |
| 608p | 1,2,3 | 999 | | END | | | |
| 608q | END | | | | | | |

FIG. 3

PROVIDING A PRESENTATION ON A NETWORK HAVING A PLURALITY OF SYNCHRONIZED MEDIA TYPES

CROSS-REFERENCE TO RELATED APPLICATIONS

The present application is a continuation of U.S. patent application Ser. No. 12/265,961 filed on Nov. 6, 2008 now U.S. Pat. No. 8,046,478 issued on Oct. 25, 2011, which is a continuation of U.S. patent application Ser. No. 11/468,485 filed on Aug. 30, 2006, now U.S. Pat. No. 7,490,169 issued on Feb. 10, 2009, which is a continuation of U.S. patent application Ser. No. 10/622,358 filed on Jul. 18, 2003, now U.S. Pat. No. 7,133,896 issued on Nov. 7, 2006, which is a continuation of U.S. patent application Ser. No. 09/675,527 filed on Sep. 29, 2000, now U.S. Pat. No. 6,598,075 issued on Jul. 22, 2003, which is a continuation of U.S. patent application Ser. No. 09/052,862 filed on Mar. 31, 1998, now U.S. Pat. No. 6,161,137 issued on Dec. 12, 2000, which in turn claims the benefit of U.S. Provisional Patent Application No. 60/041,770 filed on Mar. 31, 1997, the entire contents of which are incorporated by reference herein.

FIELD OF THE INVENTION

The present invention relates to a presentation system and method for presenting a presentation via a communications network. More particularly to a presentation system and method wherein timing values are used for synchronizing a performance of first and second presentation data at one or more client nodes.

BACKGROUND OF THE INVENTION

Interactive or live presentations via a telecommunications network (i.e., "telepresentations" such as teleconferences etc.) are becoming a viable alternative to face-to-face meetings due to the greater cost effectiveness of such telepresentations. However, there is still substantial expense in conducting such a telepresentation, particularly when the presentation members (i.e., presentation leaders and audience members) reside at a large number of geographically scattered sites. In particular, each of the sites may require specialized video conferencing systems with high data transmission lines for connecting the telepresentation members. Thus, due to the expense of provisioning and maintaining such networked conferencing systems, corporations typically have only a small number of such conferencing systems at strategically located telepresentation centers for conducting such telepresentations. However, there are numerous drawbacks to this approach, such as:

The dedicated telepresentation centers are expensive to maintain;

Presentation participants are still required to travel to these centers; and

Potential members of such a presentation who are not able to access such a center are excluded from the presentation.

Accordingly, it would be advantageous to have a network presentation distribution system that alleviates these drawbacks, wherein such a system would allow individuals to access and/or participate in a presentation using standard telephony and Internet network connections found in most offices and many homes.

SUMMARY OF THE INVENTION

The present invention is a network presentation distribution system for providing a presentation, via one or more communication networks, to a plurality of presentation members simultaneously. That is, the present invention distributes a presentation synchronously to presentation members via the one or more communication networks, wherein a communication network is defined as both the physical components and the communication protocol(s) utilized on the network components and wherein the term, "presentation members" (also denoted "users"), includes both audience members (also denoted "clients") and presentation leaders. Moreover, the present invention provides interactive and/or real-time presentations to presentation members that are geographically scattered when each such member has access to one or more commonly available communication networks such as the Internet and a conventional telephony network for telephone-to-telephone voice communication. For example, the present invention may communicate the video portion of a presentation to a user site via the Internet (more generally, via any TCP/IP network) while a corresponding audio portion may be communicated to the user site via a conventional telephony network and a conventional telephone at the user site. However, other embodiments are also within the scope of the present invention. For example, both the video and audio portions of the presentation may be provided solely by a TCP/IP network such as the Internet, assuming that there is sufficient communication bandwidth to synchronize presentation transmissions to the presentation members.

The present invention distributes a presentation (synonymously also denoted a Ashow@) to presentation members by a novel distribution of presentation materials among network server nodes of a TCP/IP network (hereinafter assumed to be the Internet for simplicity). That is, due to the typically "bursty" nature of transmissions between nodes of such a network, a version of the presentation may be accessed synchronously from different network server nodes, or different versions of the presentation may be accessed synchronously from one or more of the network server nodes. Thus, in one embodiment, the present invention provides for a plurality of at least one of:

One or more network server nodes (each hereinafter also denoted synonymously as a Anetwork server,@ "content webserver", "content supplying node", and "supplying node"), whereby audience members receive presentation materials; and/or Different versions of the same presentation, accessible from the one or more of the content webservers, wherein each version may be for a different group of audience members such as a group for Japanese speaking audience members, or audience members affiliated with a particular organization.

Note that each of the one or more presentation versions includes one or more presentation segments (hereinafter also denoted simply "segments") that provide different portions of the presentation. More precisely, subcollections each having one or more segments are provided as presentation Aelements@ in that each such subcollection is intended to be an indivisible portion of a presentation performance. Moreover, each version of a presentation typically has its subcollections of segments (i.e, presentation elements) ordered according to their presentation sequence. Moreover, substantially every segment (or subcollections thereof) in one version corresponds with a segment (or subcollections thereof) having the same presentation order, in each of the other versions. Thus, assuming corresponding segments (or subcollections thereof) in different versions have approximately the same presentation duration, any of the corresponding alternative segments (or subcollections thereof) from different versions can be presented as a replacement for another such corresponding segment (or subcollection) during the presentation.

Thus, it is an aspect of the present invention to provide corresponding alternative segments (or subcollections thereof) having substantially different network transmission requirements so that such corresponding alternative segments (or subcollections thereof) can be substituted for one another depending on the performance of the communications network. For example, the segments (subcollections) of a first version of a presentation may require a network transmission rate sufficient for real time or animated video and the segments for another version of the presentation may only require a transmission rate sufficient for graphic slides. Thus, of a set of corresponding segments (subcollections), one segment (subcollection) may merely be an audio presentation via a telephone, whereas an alternative segment (subcollection) may be a multimedia presentation element that is a combination of one or more of the following types of HTML multimedia data: audio, images, animation or video, wherein such a multimedia element plays over a set period of time and can be as simple as a single image or as complex as a combination of images, audio, animation and video. Furthermore, segments may include interactive questions that audience members answer by, e.g., clicking on their display screens.

Note that it is also an aspect of the present invention that an ordering of predefined segments (or subcollections thereof) is capable of being presented and archived, and subsequently represented. Moreover, such an ordering can take into account alternative segments for the presentation. Thus, multiple sequentially-ordered scripts can be created so that the leader can choose to change scripts in the middle of a presentation based on user feedback. Accordingly, a presentation leader has the ability to stop presentation of a particular script and its current subcollection of segments and change to a different subcollection of segments to be delivered to the audience. Subsequently, the leader can then resume the initial script at any time.

Accordingly, to take advantage of this novel distribution of presentation materials, the present invention coordinates and controls computations and presentations at each client network node for each presentation audience member (hereinafter each such network node also may be synonymously denoted as a Aclient node,@ "user network node" or simply "user node") substantially simultaneously. In particular, one or more presentation controlling network connected nodes (each hereinafter also denoted a "host node") is provided for transmitting presentation controlling commands to the client nodes so that there is retrieval of the presentation segments from one or more versions of the one or more network content server nodes depending on, for example, performance characteristics of network transmissions. Thus, it is an aspect of the present invention to dynamically and adaptively switch between content webservers and/or versions of the presentation according to network transmission characteristics at each client network node so that the clients at the client nodes have presented to them simultaneously, synchronously and in real time, corresponding (in content) segments of the presentation. For example, a first client (at a first client node) may experience the presentation as an ordered series of presentation segments, wherein the first and second ordered segments are presented in full animation, wherein the first of the ordered segments is obtained from a first content webserver and the second segment of the ordered segments is obtained from a second content webserver. Moreover, synchronously with the presentation to the first client, a second client (at a second client node) may experience the presentation in a slide show format from a third content webserver, wherein the initial two segments presented are corresponding alternative segments to the first and second segments presented to the first client. Additionally, a third client may synchronously experience the first segment of the presentation via network transmissions from the first content webserver but subsequently experience the corresponding slide show alternative to the second segment from the third content webserver due to, for example, network transmission slowdowns.

It is a further aspect of the present invention to synchronously provide audio and video portions of the presentation through different communication channels (a communication channel being a physical signal transport path together with a particular signal protocol). For example, in one embodiment of the present invention (denoted hereinafter the "Telephony/Internet embodiment"), the audio portion of the presentation is communicated audibly directly to a standard telephone using conventional voice grade telephony transmissions, and the corresponding video portion of the presentation is transmitted via a different network such as the Internet (more generally referred to herein as a "communications network") using, e.g., a modem to interpret the transmission signals.

It is a further aspect of the present invention to provide the same audio presentation portion to each client, and in this manner, maintain the continuity of the presentation between clients. Thus, regardless of the version of the video presentation provided, the clients have their presentations synchronized by at least experiencing simultaneously the same audio presentation.

It is also an aspect of the present invention to allow presentation members to communicate with one another. For example, in the Telephony/Internet embodiment, a client may communicate with other presentation members (including the presentation leader) during the presentation via the phone and/or by Internet messaging.

In providing the above capabilities of the network presentation distribution system of the present invention, one or more of the previously mentioned presentation controlling network nodes ("host nodes") are utilized, wherein these nodes direct the flow of the presentation data between the presentation members. For example, in the Telephony/Internet embodiment, such a host node, upon receiving the presentation instructions from a presentation leader indicating the next presentation segment(s) to be presented, transmits Internet presentation control signals to each of the client nodes identifying the next collection of corresponding versions of video segments from which each client node is to select a video segment for presenting. Additionally, the host node coordinates any accompanying audio portion for this segment so that the timing for the presentation of these audio and video portions of the segment(s) are synchronized.

Moreover, during a presentation a host node provides a leader of the presentation with the ability to establish and control audience member involvement in the presentation. In particular, in the Telephony/Internet embodiment, this aspect of the invention is provided by the leader controlling the functionality of one or more phone bridges through which all the audio communication during the presentation may be routed. Accordingly, at any point the leader can speak into a microphone and broadcast his/her live voice to the audience members through the phone bridge(s). This live voice audio is automatically mixed with any segment audio concurrently being provided by the phone bridge(s). The leader can control the volume of the segment audio routed through the phone bridge(s) via controls at a leader control station (or simply Aleader station@). When enabled by one of the phone bridges, the leader can also control the relative volume of his/her microphone. Otherwise the audio presentation portion routed through the phone bridge(s) is balanced by the automatic gain control on the phone bridge(s).

It is also an aspect of the present invention that any audience member can Arequest the microphone,@ from the leader to speak to the presentation audience. Accordingly, the leader has the ability to allow an audience member to speak to the entire audience. The leader can, of course, also choose to stop such audience participation at any time. Thus, the presentation leader may enable and disable audience member involvement during the presentation.

It is also an aspect of the present invention that whenever an on-screen question is answered by audience members, the results are automatically collected and can be graphed. The leader can choose to display the graphical results to all of the audience members. An audience profile database may be created with the data obtained from each audience member. Note that the audience profile database is maintained beyond any one presentation if such is desired.

It is yet another aspect of the present invention that in parallel with all of the other types of interactions between presentation members, text messaging between the leader and any or all of the audience members is done through a messaging window. Further, audience members can send private messages to the leader as well as each other. These messages can be read during the presentation without interrupting the flow of the presentation.

In another embodiment of the present invention, note that both the video and audio portions for a presentation may be provided by the Internet. Moreover, the present embodiment and the Telephony/Internet embodiment discussed above may be intermixed during a presentation so that some clients may receive the entire presentation via the Internet (more generally, via a communications network having physical transport and protocol(s) for supporting multimedia presentations) whereas other clients may receive the audio portion of the presentation via telephony transmissions of conventional voice communication through a telephone handset.

Thus, audience members may simultaneously receive a coordinated sequence of multimedia data controlled by the leader to be displayed, e.g., by an Internet browser such as Netscape Navigator or Microsoft Internet Explorer. Moreover, the present invention supports standard media types, e.g., GIF animation, as well as plug-in components such as Java and Shockwave for presenting the data (audio, graphic images, animation and video) in real time at an audience member=s browser. Furthermore, several variations of presentation content can be delivered based on, e.g., the current bandwidth available and the client=s affiliated network server(s).

Accordingly, the following advantages are provided by the present invention.

Allocated Bandwidth for Server Data Availability: The present invention allows the leader to selectively organize the number of audience members drawing data from a particular communications network server. By limiting the number of audience members on such a server to no more than 75, and controlling the presentation services provided to audience members, presentation related data availability is enhanced for audience members.

Enhanced Reliability Through Distributed Components: The present invention supports presentation content being distributed to any number of communications network (web) servers for enhanced reliability. Thus, if one of these network servers becomes inaccessible during a presentation, the present invention utilizes a notion of Avirtual servers@ (i.e., a collection of a number of communications network servers from which presentation data can be selectively transmitted) for determining an alternative communications network server. Accordingly, this allows the clients (audience members) using the affected communications network server to be switched to another network server in the virtual server collection during the presentation.

Evens out ABursting@ of Data by Distributing Its Delivery: Although each segment of a presentation is treated as a unique (multi)media element, the present invention is capable of delivering an entire collection of presentation segments to a client node while the presentation is being performed. This enables a more smooth flow of data during the presentation even though the segments may be transferred to client nodes in bursts.

Monitors Transmission Bandwidth and Alternate Data: Even with enhanced presentation data availability and distributed communications network (e.g. web) servers, there is still the possibility of data delays from a slow network server of a saturated communications network (e.g., Internet) service provider. Accordingly, the present invention monitors: (a) characteristics of network transmissions of presentation materials to client nodes, e.g., the transmission network bandwidth (e.g., the data transmission rate), and (b) the amount of data cached on each client=s node. Thus, when the data required for a segment is not timely cached prior to its intended performance at a client=s node, alternate segment data is automatically requested from the communications network by the client node. In particular, the client node may request the segment data from an alternate communications network server through network address (URL) selection of the alternate communications network server.

Allows Presentation Participants to Reconnect and Synchronize with a Presentation in Progress: If a presentation participant is disconnected from the communications network (e.g., Internet) during a presentation, there is a simple reconnect option to put the participant back in the presentation synchronized with the rest of the participants. Note that since the audio portion may be provided via a separate telephony (voice communication) network, it is likely that the disconnected participant is able to maintain the continuity of the presentation.

Utilizes Controlled Client Requests: For a given presentation, the present invention directs each client node to request presentation content from a given set of communications network servers rather than having such servers push presentation content to the client node. Among other advantages, this enables dynamic control of the pace of the presentation by a presentation leader while each client node selects specific display materials to attain that pace. Moreover, this strategy of requesting presentation content is typically not blocked by network firewalls such as are common in communicating with secure corporate intranets.

Allows a Presentation to be Provided in Several Languages Simultaneously: The present invention's distributed network processing architecture makes it possible to present concurrently a presentation with content provided in natural languages specific to the audience members. For example, for the same presentation performance, different audience members may have the audio portion of the presentation presented in different languages, e.g., English and Japanese. Moreover, the video content (e.g., on HTML pages) can be specified so that written text provided in the presentation can be displayed in different natural languages, depending on audience member preference.

Cooperates with Firewalls: The present invention allows confidential presentation data to be kept within a corporate intranet behind a firewall (i.e., a network security feature that restricts communications with devices not included in the intranet, and in particular, that restricts the access to data stored within the intranet). Thus, the present invention allows a show or presentation to be controlled externally from the firewall, while at least the confidential data remains within the firewall and is presented to only those within the firewall under the direction of a leader that is potentially outside the firewall. Further, because the present invention employs a Aclient-request@ technology, where each presentation member=s browser requests information from a communications network server, typically data transmissions in response to such requests are not blocked by most firewalls.

Other features and benefits of the invention will become apparent from the detailed description and the accompanying figures herein.

BRIEF DESCRIPTION OF THE DRAWINGS

FIG. 3 is an illustration of a presentation script for the present invention.

DETAILED DESCRIPTION OF THE PREFERRED EMBODIMENT

Figure 1A:
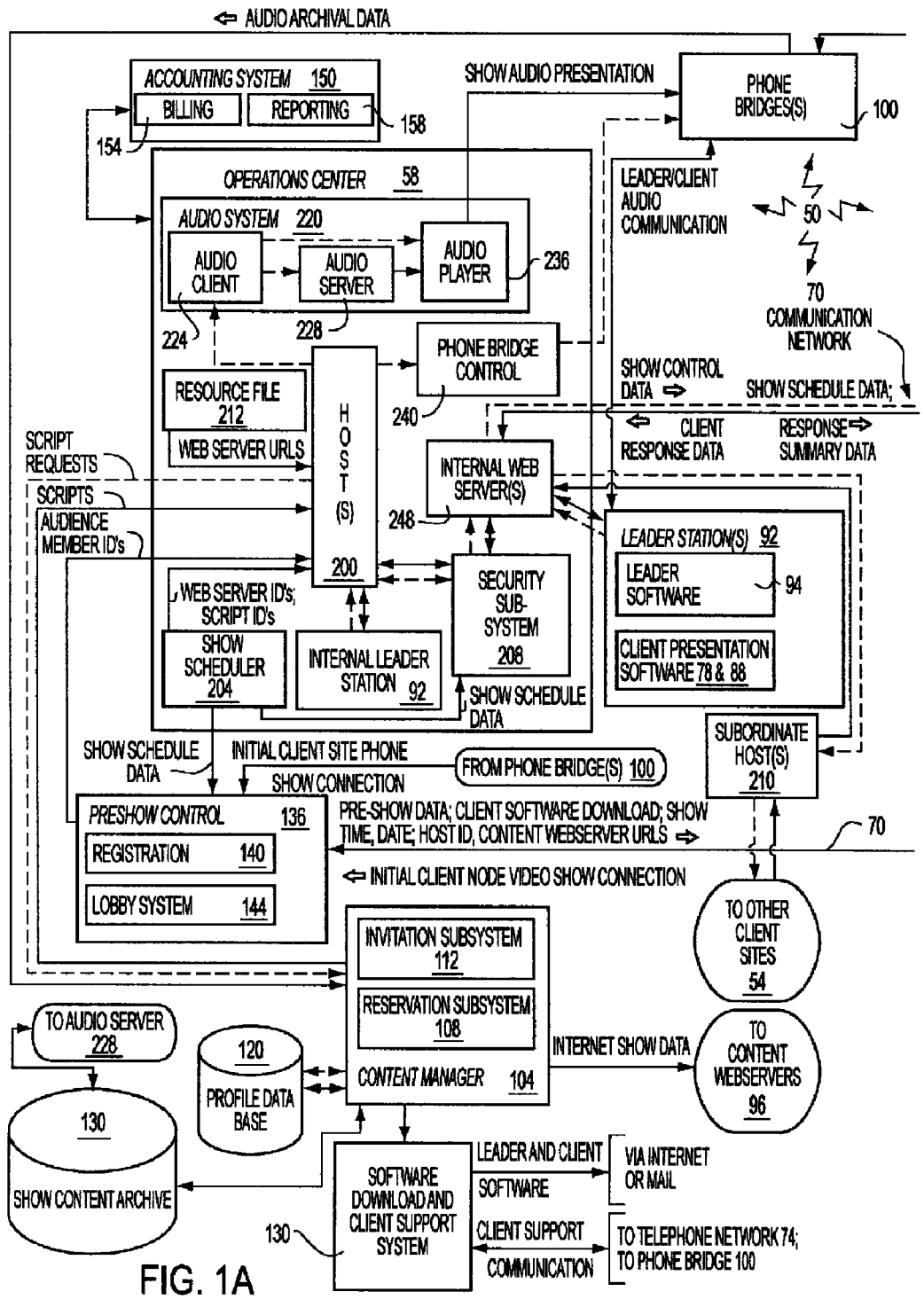
FIGS. 1A and 1B are a block diagram showing the functional components of the present invention such as the Internet.

In FIG. 1, a block diagram illustrating the components of the presentation system 50 of the present invention is provided, wherein solid arrows denote presentation data flows and dashed arrows denote control data flows. Note that the presentation system 50 utilizes the following high-level components:

Client Sites 54: Client sites 54, where audience members receive a presentation. Typically, at least some of the client sites 54 are sufficiently geographically dispersed so that a face-to-face presentation is not possible. Additionally, note that each client site 54 has at least one of a client node 56 (e.g., a personal computer), and a telephone 62, wherein the client node 56 may receive video (and possibly audio as well) information from a communications network 70 such as the Internet, and the phone 62 may be used for receiving an audio portion of the presentation routed separately through one or more voice grade telephony networks (collectively labeled 74). Accordingly, if the client node 56 is resident at a client site 54, then a network interface software package is required for receiving, e.g., video presentation information from the communications network 70 (e.g., including the Internet). For many networks (such as those including the Internet), this software package includes a network browser 78 such as the Internet browsers offered by Microsoft and Netscape, together with a client presentation software system 88 that coordinates with the browser 78 for requesting, receiving and displaying presentation segments (from the network 70) as appropriate during the presentation.

Leader Stations 92: One or more presentation leader stations 92 that provide the leader(s) of a presentation with the ability to control the content of the presentation, the pace of the presentation, and any interactive communication with and between presentation audience members. Note that each leader station 92 includes the client presentation software 88 and a network browser 78 so that each leader can also view the presentation as it is perceived by audience members. Additionally, the leader station(s) 92 also have leader-specific presentation application software 94 for allowing a leader to control and direct a presentation.

Note that each leader station 92 is connected to components of the operations center 58 either through the communications network 70, or directly using a 28.8 kilobits per second or ISDN 128 kilobit dial-up phone connection. The operations center 58 amplifies a presentation leader=s scope of control using Internet Standard protocols (e.g., TCP/IP, FTP, etc.) to simultaneously transmit commands to a large group of clients. There may be one or more leader stations 92 per presentation performance. The leader tasks can be divided among a plurality of leader stations 92 to create, e.g., moderator, presenter, and show-control leader stations. These leader stations 92 may be co-located or geographically dispersed.

Operations Center 58: An operations center 58 for coordinating, at least at a high level, presentation start-up and presentation communication under the direction of a presentation leader at a leader station 92.

Content webservers 96: One or more content network server sites 96 (also denoted content webservers 96a, and alternate content webservers 96b) for providing presentation data to client sites 54 requesting such data via client nodes 56. Note that for the client sites 54 illustrated, the content webservers 96a represent the presentation information suppliers of first choice. However, if difficulties (or expected difficulties) are encountered at one of the client sites 54 regarding receiving presentation segments prior to their time for display, then the client presentation software 88 at the client site is capable of requesting, via the browser 78 at the client site, presentation segments from an alternate content webserver 96b prior to or during the presentation.

Phone Bridge 100: One or more phone bridges 100 for supporting voice communication during a presentation is provided. The phone bridges 100 route the audio portion of a presentation to certain client sites 54, thereby providing communications between the leader(s) and the audience members, and also providing communication between the audience members themselves.

Each phone bridge 100 receives its commands via a direct dial up phone connection from a phone bridge control 240 (discussed hereinbelow). The present invention may utilize a variety of phone bridges 100 to deliver audio and collect responses (e.g., voting by audience members on presentation presented issues). Note that each phone bridge 100 is enabled either directly through an application program interface (API), or by simulating a remote operator for the phone bridge. Some embodiments of the present invention utilize the following features provided by the phone bridges: an interactive mode, an audio only mode, call-back mode, and sub-conferencing (virtual conference table) mode, wherein these terms may be defined respectively, as: the leader and audience members are able to speak simultaneously to all presentation participants (interactive mode), the leader speaks to all audience members while all audience member phones have muted microphones (audio only mode), the phone bridge calls audience members (using a phone number provided via presentation registration and/or a connection with the client presentation software 88 at the client=s client node) for connecting for the audio portion of the presentation (via, e.g., the public switched telephone network) (call-back mode), subgroups of the audience and/or leaders are in the interactive mode with each other while in audio mode for the presentation performance (virtual conference table).

In cases where the presentation audience is mixed, with some members participating via teleconferencing or video conferencing and others viewing the presentation, voting for those who do not have an interactive network 70 connection can be accomplished with phone 62 pulse responses to one of the phone bridges 100. In particular, these votes can be transferred to the operations center 58, and (as with any audience member responses) optionally transferred to the profile database 120 described hereinbelow. Note that at the leader=s discretion, a phone bridge 100 can be used to implement a help desk, wherein audience members requesting help before or during a presentation can be connected with a help desk operator for technical or customer support. The phone bridges 100 can also be used by the leader to implement subconference chat groups for localized question and answer sessions following a presentation performance.

Content Manager 104: A content manager system 104 for managing presentation scripts and data. The content manager 104 logs and confirms the locations and addresses of content webservers 96 where the content for each presentation will reside. The content manager 104 distributes presentation data, such as scripting information for a presentation, thereby providing:

initial groupings of audience members according to, e.g., natural language preferred, organizational affiliation, geographical location, and/or intervening network connections and devices (e.g., firewalls and other security features, local area network connections), and/or sequencing of presentation segments to the operations center 58 (and more particularly, the host(s) 200 described hereinbelow).

Additionally, the content manager 104 distributes presentation content (e.g., presentation segments) to the content webservers 96 and verifies that the content is capable of being presented to audience members immediately before a presentation time. Note that the verification process makes sure that all the links in the presentation or show can be resolved appropriately. Finally, at the end of a presentation performance, the content manager 104 may remove the presentation content from one or more of the content webservers 96.

Further note that the content manager 104 includes a reservation system 108 for maintaining a schedule for presentation and for reserving resources of the operations center 58, and any presentation leader support such as leader stations 92. The content manager 104 also includes an invitation subsystem 112 that is capable of maintaining invitation lists of candidate audience members, together with corresponding addresses (e.g., e-mail addresses) for various presentation performances. Additionally, the invitation subsystem 112 is capable of accessing client profile information for past audience members residing in the profile database 120. Accordingly, by comparing client profile information in the profile database 120 with the information in various invitation lists, and/or presentation descriptions (e.g., keywords, etc.), prospective audience members for a particular presentation can be notified of future similar presentations via, e.g., e-mail.

Additionally, the content manager 104 is also responsible for accessing and maintaining a show content archival database 126. Thus, following a live presentation performance using the present invention, the content manager 104 is capable of downloading the presentation content from the various content webservers 96 as well as presentation information retained in the operations center 58 into the show content archival database 126 for storage and/or possible replay. Note that the audio portion of a presentation is stored as a single continuous recording made by one of the phone bridges 100 during the presentation. Further note that the presentations stored in the show content archival database 126 are capable of being transmitted to various network 70 sites for subsequently time-delay delivery if desired.

Software Download and Client Support System 130: The present invention includes a software download and client support system 130 for providing presentation enabling software (e.g. client presentation software 88) to both client sites 54 and leader stations 92. Additionally, the software download and client support system 130 supplies presentation software to the leader stations 92 that allows leaders to control and direct their presentation performances. Finally, the system 130 provides client support via, e.g., the telephony network 74.

Pre-show Control System 136: A pre-show control system 136 for providing audience members and potential audience members with presentation related information both for registering for presentation performances and for establishing initial network (70 and/or 74) connections immediately prior to a presentation performance, so that presentation content can be provided to each audience member=s client site 54. Thus, the pre-show control 136 provides audience members and prospective audience members with presentation booking information such as presentation topics, presentation performance dates, times, identification of leaders and/or lists of participants. Further, the pre-show control 136 also provides presentation content and script information to the operations center 58. Within the pre-show control subsystem 136, there is a registration module 140 and an associated network interface (not shown), wherein audience members confirm their registration for a presentation performance, via, for example, network 70. Note that confirmation of presentation performance registration includes, if necessary, a download of presentation specific software that provides a client with an icon on the client=s client node 56 as a reminder of the scheduled presentation performance date and time for which the client has registered. Further, if the presentation for which the client has registered requires one or more software audio or video software systems, then the downloaded application software checks for these systems on the client=s client node 56 and subsequently advises the client if one or more of the software systems required must be downloaded prior to the presentation performance.

Further note that the presentation application software downloaded to a client node 56 from the registration module 140 may be used for: configuring the client node 56 appropriately for the subsequent presentation performance, running tests at the client node for assuring that the presentation will be presented properly, allowing the client node to pre-load certain content portions of a presentation, and/or providing the client with access to the lobby system 144 (discussed hereinbelow) for establishing initial network (70 and/or 74) connection(s) immediately prior to a presentation performance.

Note that the software application downloaded from the registration module 140, in one embodiment, also allows a client to preview highlighted web pages of the upcoming presentation. Moreover, this software may allow the client to reconfigure and re-test his/her client node 56 for determining whether a desired configuration has been provided for a presentation performance.

Regarding the lobby system 144 also contained in the pre-show control 136, the lobby system provides the initial connection point(s) for the audience members immediately prior to a presentation performance for which the audience members have registered. Accordingly, once network 70 and/or 74 connections have been established, the lobby system 144 connections are transferred to the operations centers 58 at commencement of the presentation performance.

Accounting System 150: In one embodiment, an accounting system 150 is provided for the present invention for managing its financial operations. In particular, the accounting system 150 includes a billing system 154 for maintaining a chart of accounts for both billing clients (and/or their affiliated organizations) having received a presentation, and billing presentation leaders (and/or their affiliated organizations) requesting the services of the present invention for distributing performances of their presentations. Additionally, the accounting system 150 also includes a reporting subsystem 158 that outputs reports related to presentation performances, to clients and presentation leaders.

Referring now to the operations center 58, a high level internal structure of this component will now be described. This component includes one or more host modules 200 for coordinating: (a) the dissemination and timing of presentation content under the direction of a presentation leader(s), (b) the interactions between the leader(s) and the audience members as well as between members of the audience themselves, (c) the gathering of feedback information from audience members according to, for example, answers to questions posed to the audience members during a presentation performance, and (d) providing results from audience participatory responses to the leader(s) and/or audience members. Accordingly, note that in one embodiment of the present invention, the computer on which a host 200 is resident has the following features: 64 megabytes of RAM, 166 MHz Pentium processor, NT operating system, Ethernet network card, in a configurable CUBIX backplane available through CUBIX, Inc., 2800 Lockheed Way, Carson City, Nev.

Each such host 200 is capable of managing one hundred or more interactions with clients and/or subordinate hosts 210 wherein the subordinate hosts are distributed on the network 70 to thereby increase an operation center host=s span of control by 100 or more clients and/or further subordinate hosts per subordinate host to create an unlimited audience. Note that each host 200 receives presentation script information from the content manager 104 in preparation for initiating the performance of a presentation. Further, each host 200 receives from the lobby system 144 audience member identifications for each presentation performance controlled by the host immediately prior to the performance of the presentation. Note that each such audience member identification typically includes: (a) a unique six digit client identifier which is encoded into the client presentation software 88 for each presentation performance client, and (b) a three digit group identifier for assigning one or more webservers 96 to provide presentation content. Note that the software download and client support system 130 encodes these two identifiers into the client presentation software 88 prior to distribution to client nodes 56.

The host 200 also receives content webserver 96 identifications, and presentation script identifications from a show scheduler 204. This scheduler 204 provides the functionality of the present invention for scheduling presentation performance times and the resources needed for performing each presentation. Thus, the show scheduler 204 provides the pre-show control 136 with scheduled show times and dates, and, as mentioned above, provides a host 200 responsible for a presentation with content webserver 96 identifications and presentation script identifications immediately prior to the performance of the corresponding presentation. Note that in the embodiment of FIG. 1, the show scheduler 204 may be utilized to reserve resources at various content website servers 96 as well as phone bridges 100 in addition to other resources of the operations center 58. Note also that the show scheduler 204 provides show schedule data to a security system 208, this latter system described hereinbelow. However, in other embodiments of the show scheduler 204, resources may be allocated for a presentation according to the number and geographical locations of clients desiring to participate in a particular presentation.

For each presentation performance, the presentation controlling host 200 also receives, from a presentation performance specific resource file or data base 212: (a) content webserver 96 network addresses (e.g., for the Internet, these addresses being URLs) identifying the network 70 sites having presentation content data; (b) audience member lists of clients that have registered for the presentation performance and can therefore become audience members, if they choose to; (c) groupings of registered clients; and (d) script names and locations from which to retrieve the presentation script from the content manager 104. Accordingly, note that the records of the corresponding resource file 212 associate presentation identifiers with content webserver 96 URLs and path names on these webservers where presentation content data resides. Thus, since the presentation scripts received by the hosts 200 from the content manager 104 are generic in that the scripts have variables or placeholders for content webserver 96 identities, each host 200 uses information from the corresponding resource file 212 (retrieved according to presentation identification) for resolving the undefined content webserver variables of the generic scripts, and thereby instantiating presentation scripts and presentation data with specific content webserver 96 references. Note that the resource file 212 may be created from information in a scheduling data base (not shown) populated with, e.g., content webserver 96 groupings (each grouping for supplying presentation content to a particular group of audience members) and audience member group identifications. The grouping of the webservers and the audience member groupings are both indicated by the three digit group identifier also encoded into each copy of the client presentation software 88 distributed by the software download and client support system 130 as previously discussed.

Each host 200 also sends commands to an audio system 220 for controlling presentation audio content that has been previously recorded for performance of the presentation to which the audio content is associated. In particular, a host 200 controlling a particular presentation sends audio presentation coordinating commands that direct and control the audio system 220. The audio client 224 provides the following functionality in response to host commands. The audio client 224 may (a) utilize a plurality of specialized audio players 236 depending on the audio compression of the audio portion of a presentation to be provided to the client sites 54 via the phone bridge 100, and/or via the network 70 in an alternative embodiment, (b) establish a connection to the audio server 228 at a specified network 70 location (note that in one embodiment the audio server may be accessible as an addressable node on the network 70), and (c) start, pause, resume, position within, and stop an audio playback with an identified audio file or stream. Note that in performing the functionality described above, the audio client 224 may receive the following types of commands from a host 200: a network 70 node address (URL) containing the location and the name of an audio file or stream, and the current state wherein the possible states are: playing at a particular position, paused, or stopped.

The audio client 224 controls at least two other modules of the audio system 220, in particular, the audio server 228 and the audio player 236. For a presentation to be performed, the audio server 228 is preloaded with audio presentation data by the content manager 104 prior to the performance of the presentation. The audio server 228, in turn, supplies the audio portion of selected presentation segments to the audio player 236 as directed by the audio client 224. Accordingly, the audio player 236 prepares the audio information for output to one or more of the phone bridges 100. More particularly, the audio player 236 performs the following functions: (a) receives audio IP from the audio server 228, (b) buffers IP packets received from the audio server, (c) decodes compressed audio data from IP audio packet, (d) controls an audio device (computer card) to create analog, line level, or direct public switched telephone network (PSTN) output audio signals. Thus, at the request of the audio client 224, the audio player 236 outputs audio segment information to an audio client 224 designated phone bridge(s) 100 for subsequent transmission to identified client sites 54, thereby providing presentation audio to clients in real time during a presentation performance. Thus, the hosts 200 and the audio system 220 coordinate so that the pre-recorded audio portions of each presentation are delivered to the phone bridge(s) 100 and distributed to the client sites 54 in a coordinated manner with corresponding video and/or graphic presentation segments. It is important to note that several variations of presentation content can be provided to clients based on the available bandwidth on network 70, as well as adjunct networks of various kinds that coordinate with network 70 for transmitting presentation information to client sites 54; e.g., such adjunct networks may be local area networks, virtual private networks, and corporate intranets. Further, note that the audio client 224 can direct the audio server 228 and the audio player 234 to supply corresponding pre-recorded audio versions of presentation segments in different languages. Accordingly, the audio player may simultaneously output to one or more of the phone bridges 100 a plurality of different audio versions of pre-recorded materials for a presentation that are in different languages.

Each host 200 also directs the operation of the one or more phone bridges 100 via a phone bridge control module 240. The phone bridge control module 240 provides an interfacing control system between the host 200 and the phone bridges 100 so that details of particular phone bridge 100 control commands and details of operations of phone bridges 100 need not be embedded in host 200 system software. Accordingly, under the direction of commands from the host 200, the phone bridge control module 240 is capable of directing one or more phone bridges 100 to provide the following types of audio transmissions during a presentation:

Direct phone bridge(s) 100 to route various audio presentation portions to particular client site phones 62 as well as leader stations 92;

Establish appropriate telephony connections so that an audience member can address all presentation participants;

Establish one or more audio subgroups from the collection of audience members of a presentation. In particular, for some types of presentations wherein periodic conferring among subgroups is deemed advantageous, such audio subgroups can be considered as a vehicle for providing subconferencing capabilities;

Assuming that subconference groups of audience members are capable of being provided by the phone bridge(s) 100, the phone bridge control 240 is able, if directed, to configure the phone bridge(s) for allowing a subconference group to address all audience members and subsequently return to conferring privately among the audience members of the subconference;

Instruct the phone bridge(s) 100 to monitor telephone lines of audience members for input regarding answers to questions posed to audience members and whose responses are provided via the pressing of digits on phones 62 at client sites 54;

Enable full interactive audio to all audience members where each audience member is capable of speaking to other presentation performance participants.

Place a single audience member or the entire audience into audio (listen only) mode without deactivating the audio presentation performance from the audio system 220.

Each host 200 is also in communication with the security subsystem 208 referred to hereinabove. Note that all external communications from third parties to a host 200 is routed through the security subsystem 208. This subsystem provides various kinds of communication security measures such as:

A data packet filtering router (not shown) for filtering out network 70 communications from unknown network 70 sources;

A communications protocol and port-specific firewall (not shown) for rejecting certain communications addressed to specific ports unless the communications are provided in a particular protocol such as HTTP, HTTPS, or FTP;

An encryption tunnel (not shown) for encrypting communications to be transmitted on the network 70 (via the internal webservers 248 that interface with the network 70), and for decrypting communications received from the network 70 (via the internal network servers);

A validation subsystem (not shown) for validating participants requesting access to operations center 58 resources. Validations performed here includes validating presentation performance identifiers provided by client site 54 network 70 addresses, passwords provided by clients, and client presentation software 88 embedded identifiers; and Virus Detection Software.

Note that the security subsystem 208 resides on a separate computational device from that of the host 200. Further, note that the security subsystem 208 may translate network 70 received communications into a proprietary protocol before sending such communications to other components of the operations center 58. Moreover, for network 70 communications intended for different operations center processes and/or related to different presentation performances, different levels of security may be implemented. Thus, network 70 communications for one presentation performance might include only minimal protection such as virus protection and protocol translation prior to transmitting communications to, e.g., the host(s) 200, or to the internal webserver(s) 248. Alternatively, at an opposite extreme, wherein high security is desired for a presentation, all of the features (6.1) through (6.5) may be performed for communications received form the network 70, and at least encryption is performed for communications transmitted across network 70 to, e.g., client sites 54.

The present invention also provides and/or facilitates further security features. For example, for corporations that want to guarantee the security of their data during network presentations, the distributed server architecture of the present invention allows for content webservers 96 to be placed within a secure corporate intranet 260. More particularly, such content webservers 96 may be behind a firewall 264, such that the firewall is between such content webservers and the presentation controlling host(s) 200. Thus, proprietary corporate data may reside behind the firewall 264 while presentation control may be performed externally.

Additionally, data access security can vary according to the needs of the presentation participants and/or their affiliated organizations. Thus, at one extreme, there is substantially no data security for the presentation data. Accordingly, the data may be available to anyone who knows a content webserver=s network 70 address. This security level is similar to publishing data by creating World Wide Web pages on web sites and, in fact, presentations performed using the present invention can use actual World Wide Web websites as a source for presentation data.

A simple physical security capability may be used by the present invention for protecting presentation data by controlling the time span for which the data is accessible to clients. This involves keeping the data inaccessible when a presentation is not being performed. For example, presentation data may be maintained on private content webservers 96 or in private directories until near show time, making such data available at show time, and removing the data after the presentation performance terminates. Various aspects of this time based data management capability are directed by the show scheduler 204 for the operations center 58 and the content manager 104. In particular, the show scheduler 204 may keep presentation data residing within the operations center 58 inaccessible to other components of the operations center as well as to the pre-show control 136. Additionally, the content manager 104 may prohibit access to presentation data on content webservers 96 by providing the data on the webservers substantially only during the presentation, and/or changing accessibility permissions on presentation data previously provided on the webservers so that it is substantially only available during a presentation performance.

For an intermediate level of physical security, presentation data can be located on operations center content webservers 96 (either internal to the operations center or external thereto) that require passwords, do not allow overwriting of data, and are not used for unsecured data. For high security, the intermediate security measures may be enhanced by recording each client=s identity and/or network 70 address as they connect to a host 200. Furthermore, the high security measures may only allow network 70 connections from pre-approved network addresses using a specified protocol and port number for the duration of a particular presentation for which the client is registered.

In addition to any physical security methods as discussed hereinabove, presentation data can be encrypted prior to network transfers in any manner which the clients=browsers 78 can (with plug-ins) decrypt. Assuming the network 70 is the Internet, the operations center servers 248 support common gateway interface (CGI) and Internet information server (IIS) extensions for processing URLs and a presentation can implement standard web data security by using Internet protocols such as file transfer protocol (FTP) with user identification plus password, and hypertext transport protocol secure (HTTPS). Also note that the security measures for the present invention are not restricted to providing communications on generally used port numbers (e.g., communication between the host and leaders or audience members can occur on either port 60 or port 80 in any combination for a single presentation performance. Note that special security presentation performances can be run using any port number desired when using servers 248 in the operations center, or on intranets (e.g., the secure corporate intranet 260). For dynamic data generated during a presentation (e.g., data collected from audience member responses), the HTTPS protocol is useful, even in an otherwise unsecured presentation, for transmitting questions, collecting response, and returning results through a secure sockets protocol. In particular, the HTTPS protocol provides an encryption method generally accepted as secure enough for transmission of sensitive financial data over public networks. Accordingly, this provides security for collected client information because the response data is transferred to a host 200 in an encrypted format. Furthermore, the presentation performance controlling host 200 protects the received data by not sharing it, and the host 200 does not support standard network 70 (Internet) data access protocols.

Additionally, note that the presentation controlling host 200 is secured separately from the presentation data security. In particular, each host 200 executes on a server within the operations center 58, wherein the host will only accept a network 70 connection from a client node 56 having the appropriate version and/or identification for a presentation being controlled by the host. Moreover, the client and/or the client=s presentation software 88 must be able to access the host 200 through its network 70 address and present the correct presentation identification at the time of the presentation performance.

Since the show scheduler 204 selects the host 200 from a plurality of such hosts and also selects the time window for each presentation performance, several other security measures may be implemented for a presentation performance including: restricted access to the client presentation software 88, uniqueness of each presentation performance identification, encoding of the network 70 (Internet) address of the host for the presentation and scheduling the date and time of the presentation. Note that the show registration system 140 facilitates these security measures in the show scheduler 204 by providing encoded presentation invitation network addresses (URLs) to clients and/or their client nodes 56. Further, addresses of clients for a particular presentation may be sent to each of the content servers 96 having data for the presentation. Thus, when such a content server 96 receives a presentation data request from a client node 56, the client=s address, the presentation identification, and the presentation performance schedule time may be validated at each content webserver 96 accessed.

The degree of security placed on presentation performance invitation distribution and the verification of invited presentation participants by each content webserver 96 is selected by a sponsor of the presentation. Note that the invitation system 112 does not have a direct data connection to the show scheduler 204. Thus, accidental release of sufficient presentation performance information to allow unauthorized access to a presentation performance is unlikely.

Additionally, to provide for dual path information security (e.g., to and from the operations center 58), the presentation software 88 can also require a password for activation, wherein the password is unique to the client and/or unique to a particular configuration of the client=s client node 56 and wherein the password may be manually entered immediately prior to a presentation connection to a host 200. Note that for presentations using data secured within a secure corporate intranet 260, the client host connections can transmit encrypted network 70 addresses.

Since each host 200 does not have access to presentation resources (e.g., invited client lists, content webserver 96 addresses, presentation thumbnail images, sign-on passwords, phone bridge 100 type and presentation scripts) until the show scheduler 204 sends them to the host 200 with the presentation startup commands, or a leader for the presentation adds resources to an active presentation performance, it is remote that sensitive and/or proprietary presentation data can be accessed through a host 200. Moreover, a sponsor can create and perform a presentation without the presentation content data ever residing at the operations center 58. Further, in cases where interactive response data received during a presentation performance is considered extremely sensitive, the sponsor may process the client responses at sponsor controlled network sites and subsequently, if desired, forward statistical summaries to the presentation controlling host 200 for any desired distribution to audience members.

Regarding security and presentation leaders, the leader(s) of a presentation can be verified by use of one or more passwords in addition to the host 200 address, port number, presentation identification, and presentation performance time for his/her presentation performance. Note that such leader passwords may be unique to each presentation performance and may be supplied to the presentation controlling host 200 by the show scheduler 204 immediately prior to the start of a presentation performance for thereby validating presentation leader(s). Additional leader information may be also provided to enable multiple leaders for a single presentation performance and to also enable different presentation control functions to be allocated among leaders according to their presentation passwords.

The leader software 94 may be distributed to presentation leaders and/or leader stations 44 by diskette or by a network 70 download. This software may be generated with built-in addresses and presentation identification numbers as well as particular ports for connecting to the presentation controlling host 200. Note that since presentation leaders have access to various resource usage, supply and change capabilities, additional security measures may be applied to leaders and the leader software 94. In particular, for leaders connecting through the network 70 (Internet), an encryption tunnel (not shown) can be established on the leader host connection, wherein such an encryption tunnel provides encapsulation of a proprietary high security protocol within the IP protocol. Further, to provide secure, high reliability connections directly to a leader, the operations center 58 maintains several dial-in lines which may be used at 28.8 kilobits per second or ISDN rates (e.g., of up to 128 kilobits per second). Note that connections on such dial-in lines are also usable by presentation audience members at the leader=s discretion if their client identifiers are available to the operations center 58 from the content manager 104 after the leader connection is accepted.

If the above described security features are utilized by the present invention, then it is able to deliver a presentation performance with any mixture of security levels between the two extremes of: (a) no security processing of transmitted audience member responses, show data content, or presentation data locations, and (b) full security processing with only invited audience members, securing all audience member responses, storing and protecting the presentation data content, and securing the connection between each leader or audience member and the presentation controlling host 200. Furthermore, the security of the operations center 58 may be audited using hacker prevention tests and virus detection and prevention methods as one skilled in the art will understand.

FIGS. 2A through 2D represent a flowchart of the high level steps performed by the network presentation system 50 the present invention. In particular, this flowchart illustrates the high level steps performed for both initiating and operating a presentation for audience members at clients sites 54. Accordingly, in step 404, prior to the scheduled time of a presentation performance, the show scheduler 204 supplies the host 200 assigned for controlling the presentation with an identifier that uniquely identifies the presentation performance and provides with this identifier one or more passwords that can be used by the host 200 and/or the security subsystem 208 for identifying the leader(s) and clients that attempt to connect with the host 200 as presentation participants. Note that such connections to the host 200 will typically be through the security subsystem 208 and therefore be subject to various security measures discussed hereinabove to which the presentation and its participants are subject. Subsequently, in step 408, the host 200 uses the presentation performance identifier to request the one or more scripts for the presentation from the content manager 104. Note that the presentation scripts provide: (a) identification of segments to be presented during the presentation, (b) sequencing information regarding the order of presentation of the segments, (c) alternative versions of various segments and/or collections of segments that may be by the leader(s) of the presentation. Note that further description of presentation scripts and their representations are provided hereinbelow. Also note that the presentation performance identifier is used by the content manager 104 for retrieving the presentation script(s) from the show content archive 126 for thereby returning the presentation script(s) to the host 200. In step 412, each leader for the presentation logs onto the host 200 by supplying appropriate validation information such as a password and presentation performance identifier. Further, if there is more than one leader, then additional leader identifying information may be required for differentiating the roles of various leaders for the presentation.

In step 416, the pre-show control system 136 accepts network 70 and/or network 74 connections by candidate clients for the presentation performance. Note that it is assumed that the clients have previously registered for the presentation performance with the registration module 140 and therefore have been provided with validation information (e.g. a presentation performance identifier and/or password) for validating each client as an audience member for the presentation. Subsequently, in step 420, a determination is made by the pre-show control system 136 as to whether each candidate presentation audience member is connected to the pre-show control system by the communications network 70 or by the telephony network 74. If it is determined that a candidate presentation client is connected by the communications network 70, then step 424 is performed, wherein the candidate client logs onto the pre-show control 136 with a previously provided login. Note that this login may include a presentation performance identifier for the presentation and a password for identifying the candidate client as being registered for the presentation performance. Further note that in one embodiment, this step is performed by the lobby system 144.

Subsequently, in step 428, a determination is made by the pre-show control system 136 (or the lobby system 144) as to whether the entered login is valid. If the login is determined to be invalid, then step 432 is performed wherein the connection with the pre-show control system 136 is terminated. Note however, it is within the scope of the present invention that various retries can be provided as one skilled in the art will understand. Alternatively, if the candidate client=s login is determined to be valid, then step 436 is performed wherein the pre-show control (determines whether the client's client node 56 is configured appropriately for the presentation performance). In particular, the pre-show control system 136 determines whether the client presentation software 88 is operable on the client=s client node 56. Further, the pre-show control system 136 may also determine whether the client's client node 56 has the appropriate network 70 addresses (e.g. URLs) of the content webservers 96 available for supplying presentation segments to the client node.

Subsequently, assuming the client's client node 56 is appropriately configured for the presentation performance, in step 440, the pre-show control system 136 transfers the client's client identifier and network 70 address to the host 200. Following this step, in step 444, when the time for the presentation arrives, the client's client presentation software 88 via the network 70 establishes a network 70 connection between the client's client node 56 and the host 200 controlling the presentation performance. Note that such activating may be performed during the client's login session with the pre-show control system 136 if such occurs within a few minutes of the start of the presentation. After the host 200 is contacted, it instructs the client presentation software 88 to establish a connection with one of the internal webservers 248 for dynamic content.

Additionally note that the lobby system 144 substantially provides the functionality for the present step (step 444). In particular, the lobby system 144 may maintain the login session connection until the time for commencement of the presentation performance. Moreover, the lobby system 144 may provide the client with excerpts of other presentations as well as advertisements and/or other informative material.

Following the activation of a connection between the client node 56 and a presentation controlling host 200, in step 448 the client presentation software 88 is instructed by the presentation controlling host 200 (hereinafter for simplicity referred to as the "host 200") to retrieve and cache, via network 70, one or more initial presentation segments from identified content webservers 96 where the presentation segments have been pre-stored. Note that the initial presentation segments (as well as subsequent presentation segments) may be different for clients at different client sites 54. In particular, the segments provided may depend on network 70 transmission rates, client natural language preferences, unique organizational displays and/or data (corporate logos and/or confidential financial data), and configurations of client nodes 56 (e.g. the software and/or hardware).

Returning now to decision step 420, if this step determines that the client's connection is via the telephony network 74, then in step 450, the pre-show control system 136 requests that the client enter an acoustic login via digits on the telephone 62 at the client's client site 54. Note that clients that login through telephony network 74 may intend to participate in only the audio portion of a presentation performance. However, clients who login in this manner can subsequently log in to the pre-show control system 136 via a network 70 connection and obtain a multimedia performance of the presentation.

In step 452, the pre-show control system 136 determines if the acoustic login is valid. If not, then in step 456 the call is terminated. Alternatively, if the login is deemed valid, then the pre-shown control system 136 determines the level of presentation to which the client has been assigned. In particular, the client may be assigned to an audio presentation or alternatively to a multimedia performance of the presentation. Thus, if the client has been assigned to obtain a multimedia presentation via the network 70, then in step 464 the pre-show control system 136 automatically performs any necessary pre-show housekeeping tasks for thereby allowing a more expedient network 70 login by the client for obtaining the multimedia performance of the presentation. Note that in particular, any financial transactions prior to the presentation such as credit card number transfers and/or a change of the location of the client's site 54 may also be performed during the present step. Moreover, it is also an aspect of the present invention that speech recognition modules can be used for interpreting client input. Further, note that the tasks performed in step 464 may also be performed by registration module 140 during registration for the presentation, such registration potentially occurring substantially prior to the performance of the presentation. Additionally, regardless of the flow of control path taken from step 460, step 468 is encountered wherein at the time to commence the presentation performance, the pre-show control system 136 requests that the host 200 transfer control of the client's telephony call so that it is controlled by the control bridge controller 240 for receiving the audio portion of the presentation performance. Subsequently, regardless of whether the client is to receive the presentation performance via network 70 and/or network 74, step 472 is performed wherein the host 200: (a) activates the leader software 94 on the leader station(s) 92 used in controlling the presentation performance; and (b) activates the client presentation software 88 at the leader station(s) 92 for viewing the presentation performance as an audience member will.

Subsequently, steps 474 and 476 are performed concurrently wherein each client having a client node 56 has its client presentation software 88 in a wait state waiting for a presentation command(s) from the host 200 via the network 70, while in step 476, the leader(s) for the presentation performance determines the first collection of corresponding presentation segments and transmits the identity of the selected collection to the host 200. Note that there can be more than one version of the presentation from which the leader can select segments for presenting to the audience members. Further, note that of the versions being selected, the present invention may automatically select subversions to be provided to various audience members depending upon, e.g., data rate transmissions by the network 70 from content webservers 96. However, it is also an aspect of the present invention that the leader(s) may override the automatic selection of subversions of a presentation performance and/or mandate that a particular subversion be provided to various audience members. In particular, this can be accomplished by: providing only one rendition of source material such as a high resolution corporate logo and leaving all alternate resource fields of the script blank and providing only one Alevel@ of scripted resources for that presentation collection, as will be discussed in further detail hereinbelow with reference to FIG. 3.

In step 480, if the leader station 92 providing the identity of the presentation segments is external to the operations center 58, then the security subsystem 208 checks the leader input for validity via, e.g., determining the network 70 address from which the identity of the selected presentation segments have been transmitted. Assuming that the transmission from the leader station 92 is deemed valid, in step 490, a determination is made as to whether the leader(s) has determined a next collection of one or more segments whose identities have been supplied to the host 200. In particular, the leader(s) may choose to identify such segments to the host 200, or indicate that the performance of the presentation to be terminated. Accordingly, if no other segments are determined and/or the leader(s) indicated presentation performance termination, then step 494 is performed wherein the presentation software 88 is removed from client nodes 56.

Alternatively, if an additional collection of segments is determined, then in step 500, the host 200 accesses the presentation script(s) with the leader supplied identifications for the segment collection, thereby obtaining additional data items regarding the segments of the collection as will be further described hereinbelow.

Subsequently, in step 504, the host 200 accesses the resource file 212 for resolving virtual webserver names in the accessed segment collection for thereby providing actual content webserver network 70 addresses having at least the video versions of the presentation. Additionally, note that it is within the scope of the present invention that resource file 212 can also be accessed for resolving identifiers and thereby identifying a corresponding audio portion to be presented to audience members via the audio system 220 and the phone bridge(s) 100.

Following step 504, in step 508, the host 200 sends one or more commands to each copy of the client presentation software 88 indicating both the next collection of segments to be retrieved by the client nodes and the network 70 addresses of the primary and alternate webservers 96 from which to retrieve the segment collection.

It is important to note that the host may send substantially simultaneously a different set of commands to different client sites 56 depending on the characteristics desired for the presentation at each client site.

Since processing according to the present invention occurs at a presentation host controller 200 and simultaneously at client nodes 56, during the processing steps 476 through 508 performed remotely from the client nodes 56, the client nodes as per step 474, may be prepared for accepting the next presentation commands transmitted by the host 200 in step 508. However, such host nodes 56 may be also concurrently providing various portions of the presentation performance to their respective audience members. In any event, when step 516 is encountered, the client nodes 56 have received the next host 200 transmitted commands and therefore the client nodes now enter a processing state whereby these nodes attempt to assure a timely caching of this next collection of segments for timely performance of their portion of the presentation.

In step 516, a determination is made by the client presentation software 88 at each client node 56 upon which the software is loaded, as to whether the next collection of segments indicated by the one or more commands transmitted by the presentation controlling host are presently cached on the client's client node 56. Note that this next collection of segments could have been previously cached at a client node 56 due to: directory cache commands for caching an entire file directory that was issued earlier in the presentation performance, provided by fixed media such as CD-ROM at the client nodes(s) 56, or re-use of presentation segments such as HTML page formats, background images, or logos.

Accordingly, if the next collection of segments is not cached on a client node 56, then step 524 is performed wherein the client presentation software 88 on the client node 56 uses its most recent network 70 data transmission characteristics together with the host 200 transmitted list of current network 70 addresses for content webservers 96 to select an appropriate content webserver and an appropriate version of the next collection of segments to be retrieved. Note that the selections determined in this step are performed with the goal of assuring that there is a high probability of this next collection of segments being delivered to the client node 56 prior to the time that this collection is to be used in the presentation performance on the client node. In particular, the following is a description of the steps performed in determining, from the network 70 data transmission characteristics, the content webserver 96 and the (sub) version of the next collection of segments to be retrieved. The selection of the webserver may be dependent upon the time allotted for the transfer and the network 70 transmission characteristics such as data transmission rate. The time for each network 70 transfer of a collection of segments (e.g., one or more presentation elements, each such element having one or more segments therein) is controlled by the host 200. The host 200 designates time according to at least one of the following categories: (a) no time, wherein the presentation element(s) is to be displayed immediately, (b) indefinite, wherein the amount of time for transfer of the presentation element(s) is indefinite, and (c) a specific time interval indicated in a script command for the presentation, e.g., a Avirtual time@ command as indicated by commands (rows) of the script shown in FIG. 3 having values in the 620 column as will be discussed hereinbelow. Note that as the expected amount of time for retrieving one or more presentation elements lengthens, larger groups of presentation elements may be retrieved and/or better presentation quality presentation elements may be retrieved (e.g., the presentation quality may be enhanced from limited or no animation to full animation).

Additionally, the presentation element(s) selected is dependent upon network protocols such as HTTP and FTP. For example, as the size of the presentation data and the time for retrieval increases, the present invention tends to utilize FTP for network 70 transport. Alternatively, as the size of the presentation data and the time for retrieval decreases, the present invention tends to use HTTP.

Accordingly, in one embodiment of step 524, the size of each candidate collection of one or more presentation elements is determined from the webservers 96 by, e.g., requesting such sizes. As an aside, note that an indication of the bandwidth available with each such webserver can be determined if not available otherwise. Thus, if there is a primary webserver 96*a* and an alternative webserver 96*b*, and each has presentation versions for both HTTP and FTP as well as both having animated and non-animated interchangeable presentation elements, then an expected time for retrieving each available combination is determined. Subsequently, the candidate collection selected provides first, the highest quality presentation, and second, the largest amount of presentation data possible. Consequently, the expected times are used to select the webservers 96, the collection of presentation elements, and the transfer protocol to use in providing the selected collection to the client node 56.

In one embodiment, the following selection process is used to determine the expected times: for each candidate collection of presentation elements:

The size of the collection is determined.

The size is divided by the bandwidth average for the last two minutes as measured from any network 70 transmission source. If the average bandwidth is not available, then a bandwidth from the most recent webserver is used.

A protocol overhead factor is added to the result of (b) to account for the different overheads for each of the different protocols available on network 70 that may be used (e.g., FTP and HTTP).

Select the highest quality collection of presentation elements available, and select the largest collection that can be transferred in the time available. Note that it is assumed that an indefinite time designation by the host 200 is viewed as time sufficient for any size of transfer.

It is worthwhile to note that in other embodiments of the present invention, additional network characteristics other than bandwidth may be used, as one skilled in the art will understand. In particular, such characteristics as network 70 error rates, fluctuations in bandwidth, or a predictive statistical expectation of bandwidth may be used. Additionally, note that such candidate collections of presentation elements can also be resident at the client node 56 since some portions of a presentation can be also distributed on CD-ROMs. Accordingly, step 524 of FIG. 2C (as well as other steps in the flowchart of FIG. 2) also may access a CD-ROM drive or other transportable storage media for various portions of a presentation. Also, it is noteworthy that if network 70 supports multicasting, then a plurality of client nodes 56 may have their presentation elements selected according to a single access rate (i.e., server data propagation to the network) and a single network transmission rate instead of performing individual presentation element selections.

Subsequently, in step 528, the client node 56 provides the identity of the selected webserver and next collection of segments to the client node=s browser 78 and the browser, in turn, sends a network 70 request to the selected webserver for the selected (subversion) of segments. Following this step, the client presentation software 88 monitors the time elapsed before transmission of the selected collection of segments is completed, and determines whether these segments are provided within an appropriate window of time that allows them to be presented during the performance of the presentation. Thus, in step 532, the client presentation software 88 determines whether the requested collection of segments is cached on the client node 56 within a desired time prior to the proposed performance of the collection of segments. In particular, for determining this desired time, a function dependent on one or more of: (a) various measurements related to one or more other client nodes 56 receiving the presentation performance, (b) a predetermined default length of time, as e.g., specified in the presentation script, and (c) a length of time determined by a leader of the presentation performance, e.g., during the performance. Regarding (a) above, note that measurements such as:

network 70 transmission rates for each of one or more previous requests for presentation segments;

for each of one or more previous requests for presentation segments, an elapsed length of time between the request time for the presentation segments and receipt of the segments;

for each of one or more previous requests for presentation segments, a size (e.g., in bits) of the segments received from the request.

Note that there are various functions dependent on one or more of (a)-(c) immediately above that may be used as one skilled in the art will understand. Further note that such function may be as simple as a comparison of corresponding network 70 transmission rates between (a) the client node 56 and the webserver(s) with which it is communicating, and (b) other client nodes 56 and the webserver(s) with which they are communicating. Alternatively, such a comparison may be performed on the elapsed time as in (7.2). Note that there are at least two possible alternatives here:

the present invention may attempt to retrieve the same collection of segments from an alternative content webserver;

the present invention may attempt to retrieve an alternative collection of segments that can be used as a replacement for the initially requested segment collection from either the same webserver 96 for which the original request was directed, or from an alternative webserver 96.

Accordingly, if the collection of segments is not cached within this time, then step 536 is performed wherein the client presentation software 88 determines if there is sufficient time to retry obtaining the collection of segments or another collection of alternative segments prior to the time of their estimated performance.

If in step 536 it is determined that there is insufficient time remaining, then step 474 is again activated, wherein the client node 56 (and more particularly, the client presentation software 88) prepares for the next set of one or more presentation commands from the host 200. Note, however, that even though the portion of the presentation corresponding to the collection of segments are not retrieved in time for performance, it is an aspect of the present invention that if the audio portion of the presentation is provided through the separate telephony network 74, then there may be substantial continuity in the presentation regardless of whether a portion of the video for the presentation is displayed or not.

Alternatively, if in step 536 the client presentation software 88 determines that there is sufficient time for attempting a retry for obtaining the requested collection of segments, then step 524 is again performed, wherein the client presentation software 88 again evaluates the transmission characteristics of the network 70 for selecting a content webserver 96 and subversion of the collection of segments so that there is again a high probability of the newly selected collection of segments being delivered prior to the time that these segments are to be presented on the client node 56. Accordingly, on such subsequent iterations for determining an alternative way to present a particular portion of the presentation, the following steps may be performed: The original calculation is again performed with new times and current bandwidth information usually resulting in selection of alternative segment collections that are smaller. An overall limit of three re-tries of any URL will force smaller alternative segment collections to be selected, or a message to the audience member stating that the network is not functional.

Returning now to step 532, if in this decision step it is determined that the requested collection of segments has been timely cached at the client node 56, then step 544 is performed wherein an evaluation of the network 70 transmission characteristics that occurred during the transmission of the collection of segments. In particular, the following characteristics are determined: average network data rate, the likely range of expected data rates (e.g. within a standard deviation of the most likely data rate), measurements regarding network errors and/or quality of transmission, total elapsed time taken to complete the transmission of the collection of segments, and/or the size of the transmission.

Subsequently, in step 548, a determination is made as to whether a host 200 interrupt is detected that requests a halt to the presentation of the current collection of segments. Note that this step is provided as an illustration of interrupt processing that can be performed by the client presentation software 88. Note, however, that such interrupt processing may be performed between or during substantially any of the processing steps described herein that occurs on the client node 56. Also note that such host 200 interrupts are likely to be initiated by a leader for the presentation when the leader determines that, e.g., there should be a deviation in the script for the presentation performance. Thus, regardless of where a host 200 interrupt step is performed within the processing steps for the client presentation software 88, upon detecting this interrupt, the flow of control of the present flowchart returns to a point in the processing wherein the next steps performed are the steps 474 and 476 performed at: (a) the client nodes 56, and (b) the leader's station(s) 92 and the presentation controlling host 200.

Assuming that no host interrupt is detected in step 548, then steps 552 through 560 are iteratively performed until all segments of the current collection of segments are presented to the client. Accordingly, when there are no further segments in the current collection, step 560 routes the flow of control back to the concurrent steps of 474 and 476 as discussed previously hereinabove.

Referring to FIG. 3, an illustration of a simple script description 600 is shown. Each of the rows 608 after the first column heading row describes a presentation action to be performed during a performance. Each column entry of each row 608 provides information related to the script action to be performed by the row. Following is a description of the data capable of being contained in each column.

A Script Level column 612 for identifying alternative variations of the presentation. For example, a first variation might be directed to the customers of a corporation, another variation directed to the sales representatives of the corporation, and yet another directed to the investors of the corporation. Thus, a single script may be used for a plurality of related presentations that have at least some overlapping content. Accordingly, in column 612, each digit within each row of the column identifies a presentation variation to which the row applies. Thus, row 608a is performed only in the variation of the presentation having a A1" in this column; e.g. rows: 608a, 608d, 608e, 608g through 608o. Similarly, a second variation of the presentation is performed using rows: 608b, 608d, 608f, through 608o. Additionally, a third version is provided by rows: 608c, 608e, 608f through 608n. Note, the AEND@ identifiers in 608q designates the end of the script.

An item number column 616 is provided for labeling rows so that a presentation leader can transfer to the rows having a value in this column and proceed sequentially through the script from the labeled row to which the leader transfers. This allows the leader to skip and/or rearrange portions of a presentation performance. Accordingly, there are three rows to which a leader can transfer control, namely, rows: 608a, 608e, and 608o.

A Avirtual time@ column 620 is provided wherein values in this column set and reset a presentation performance timer so that, for example, some portions of a presentation will automatically be skipped if a performance of the presentation is running behind a predetermined performance schedule. In script description 600, there are four rows 608 where the presentation performance timer is reset, i.e. rows 608a, 608e, and 608j. Thus, for a presentation performance corresponding to script level 1, in row 608a, the timer is set to 0.00 and the subsequent rows 608 for script level 1 are sequentially performed until 608e is encountered, wherein a determination is made as to whether the timer has a value greater than one minute and one second. If this is the case, then the sequential rows (for script level 1) down to row 608j are interpreted by the presentation controlling host 200, but no host commands are transmitted to either the client nodes 56, or the phone bridge control 240. Thus, it is as if the actions for these script rows are skipped. However, at row 608j, the timer is reset and each subsequent row 608 (of script level 1) is performed.

An Action column 624 is provided for designating an action to be performed (if any) during execution of a row 608. Thus, for row 608a, the host 200 instructs all client nodes 56 that a resource (e.g., a content file, or Web page) is available for downloading. Subsequently, for script level 1, row 608d instructs the client nodes 56 to cause their browsers 78 to display the resource. A list of actions that can be designated in the action column 624 are as follows:

client_Load—Instructs all client nodes 56 that a resource is available for downloading in background processing.

client_Free—Instructs all client nodes 56 to delete a previously downloaded resource.

client_Display—Instructs all client nodes 56 to cause their browsers 78 to display a resource. This command implements AExtended@ parameters when the Resource Location column 636 has a corresponding entry of ATWFTP@. The extended parameters are a second set of resource locations for retrieving the resource to which the corresponding action in the same row 608 is to be applied. For example, a second set of resource locations may be used by the client node 56 when it is determined that the FTP network 70 data transfer rate is unlikely to provide a particular presentation content file (e.g., of presentation elements) at a client node 56 in time for display.

client_play—Instructs all client nodes 56 receiving presentation audio content via a network 70 to play a resource.

leader_Hold—Causes the host 200 to suspend script interpretation until a next command is received from the leader designating a next row 608 to perform.

time_Set_At—Forces a script=s virtual time clock (i.e. timer) to a known value.

time_Hold_To—Causes the host 200 to suspend script interpretation until a particular state is reached. For example, all clients report a display element command is complete; e.g., the display of a corporate logo.

child_Script—Suspend this script, read and process another script in a manner analogous to a programming subroutine invocation.

End_Start—Defines the last line (i.e. row 608) of a script and resets execution to the first line.

END—Defines the last interpreted row 608 of a script.

Regarding the AResource Type@ column 632 of script description 600, the fields of this column provide an indication of the data types and/or organization of the presentation segment collections to which the action of the corresponding AAction@ field of the same row applies. In particular, the following types (denoted also hereinafter as "resource types") are available:

FTP_File—A single file to be pre-cached or downloaded from a webserver(s) 96 to client nodes 56 in the background using FTP or HTTP when FTP is blocked by security measures.

FTP_Dir—An entire directory of files to be pre-cached or downloaded in the background using FTP or HTTP when FTP is blocked by security measures.

HTML_File—A single HTML file containing presentation content.

MC_Question—An HTML_File to which a client response to presented questions is requested.

MC_Answer—An HTML_File to display the results of an MC_Question.

Info_Form—An HTML_File to collect data for the profile database 120.

Audio_RaFile—An audio file prepared in advance of the presentation, may be downloaded to client nodes 56 via network 70.

Audio_RaLive—Live streaming of an audio file, via network 70, requires dynamic real time buffering at the client nodes 56.

THIS LINE—Causes the host 200 to refer to the row 608 of the script having this value (i.e., ATHIS LINE@). Thus, the action for the row having this value can be viewed as needing no presentation resources.

Twscript—Another script resource used by the current script resource.

In the AResource Location@ column 636 of script description 600, each row entry indicates a location of the presentation resource to which the action for the row is to be applied. Fields of this column may provide descriptions of a number of alternative locations for obtaining various versions and/or subversions of a presentation segment collection; i.e. alternative locations have a A|" separator therebetween. The types of values that can occur in this column are:

SN—Denotes a webserver 96 Name, also may be a physical network 70 address or an Internet domain name, as one skilled in the art will appreciate.

TWFTP—Denotes the directory on client nodes 56 created to hold the presentation resources (e.g., presentation segments) downloaded from the webserver 96.

CD—Denotes a CD-ROM drive attached to a client node 56; note that during preparation for a presentation performance, client determines the drive letter corresponding to the CD-ROM drive at his/her client node 56.

LOCAL—Denotes anywhere on a client node 56, except the CD-ROM drive or the location designated by TWFTP.

END—Denotes a time when clients have used a named resource, e.g., all clients have downloaded and displayed the logo image file, as the name resource.

GOT—Denotes a time when clients have accessed the named resource, such as a time after a corporate logo file has been downloaded to all clients.

this—Denotes that no external resources such as files, webservers, etc. are required for the command having this value.

Note that in the locations designated in at least (9.1) above, variables or "placeholders" can be provided in a script so that a developer of a script need not have at his/her disposal all the particulars as to where presentation resources (e.g., segment collections) will be stored for access during performance of the presentation. For example, variables or placeholders for as yet unidentified content webservers 96 may be provided as part of a location for a collection of segments. For example, each grouping of clients from the candidate audience members registered for a presentation performance has the following placeholders in presentation scripts defined within a corresponding presentation resource file 212: (a) the placeholder, ABBA-Main@ which is to be resolved as the network 70 identifier for the webserver 96 providing access to real time and/or smaller size presentation segment subcollections, (b) ABBA-Ftp@ which is to be resolved as the network 70 identifier for a file (Internet) server holding large presentation files suitable for background download to client nodes 56, (c) ABBA-Ra@ which is to be resolved as the network 70 identifier for an audio (Internet) server, or another location that provides access to audio data for the audio player 236, and (d) ABBA-QA@ which is to be resolved as the network 70 identifier for the webserver 96 used for question and answer display sequences.

Regarding the AResource Name@ column 640 of script description 600, the entries of this column provide an identification of a presentation resource (e.g. presentation data segment file) independently of the network 70 address or node upon which the resource resides. Thus, a complete specification of a location of the resource requires the corresponding resource location and the resource name entries from the same row of script description 600. The following data types are available for fields of this column:

Path—Denotes a path name to a file directory relative to the resource location. It is assumed that a nested or hierarchical file directory notation is used to identify the presentation resource residing at the location denoted by APath@.

File—Denotes the name of a resource file.

Encoder Task—Identifies a specific real time audio stream accessible from the webserver 96 identified in the corresponding Resource Location 636 column.

Synchronization in a Presentation of Different Presentation Media and/or Media from Different Presentation Media Sources The presentation system 50 of the present invention also provides a novel method and system for synchronizing portions of the presentation from different media sources, wherein such differently sourced portions may not be synchronized with one another due to, e.g., processing and/or transmission delays of one or more of the differently sourced portions in comparison to other portions of the presentation. For example, near real-time presentation content such as slides and/or website pages can be presented on a client node 56 according to a timing schedule that is approximately with values of a real-time clock time. Thus, commands issued by a leader from a leader station 92 can be communicated to the host 200 (and/or subordinate hosts 210 as per FIG. 1) and then corresponding presentation control data is communicated to the client nodes 56 so that such client nodes can retrieve and render, in near real-time (e.g., 2-3 seconds), from one or more of the content webservers 96, first portions of the presentation. However, if at least one second portion of the presentation is provided by a more delayed and/or provided at a more varying data rate to the client nodes 56, and this second portion is to be synchronized with the presentation of the first portion, then the present invention determines the appropriate delay for presenting the first portion of the presentation so that it synchronizes with the second portion. In particular, for a live Internet presentation, the first portion may be slide displays that the leader desires to present and discuss, and the second portion of the presentation may be streaming audio and video of the leader presenting the slides. Thus, since presentation at the client nodes 56 of streaming data may be substantially delayed (e.g., 30 to 40 seconds) from real time, without the synchronization provided by the present invention, a slide can be displayed 30 seconds before the corresponding leader discussion of the slide commences. Moreover, such lack of synchronization in portions of the presentation displayed concurrently is at least annoying to presentation audience members and can substantially compromise the content and quality of the presentation.

Figure 1B:
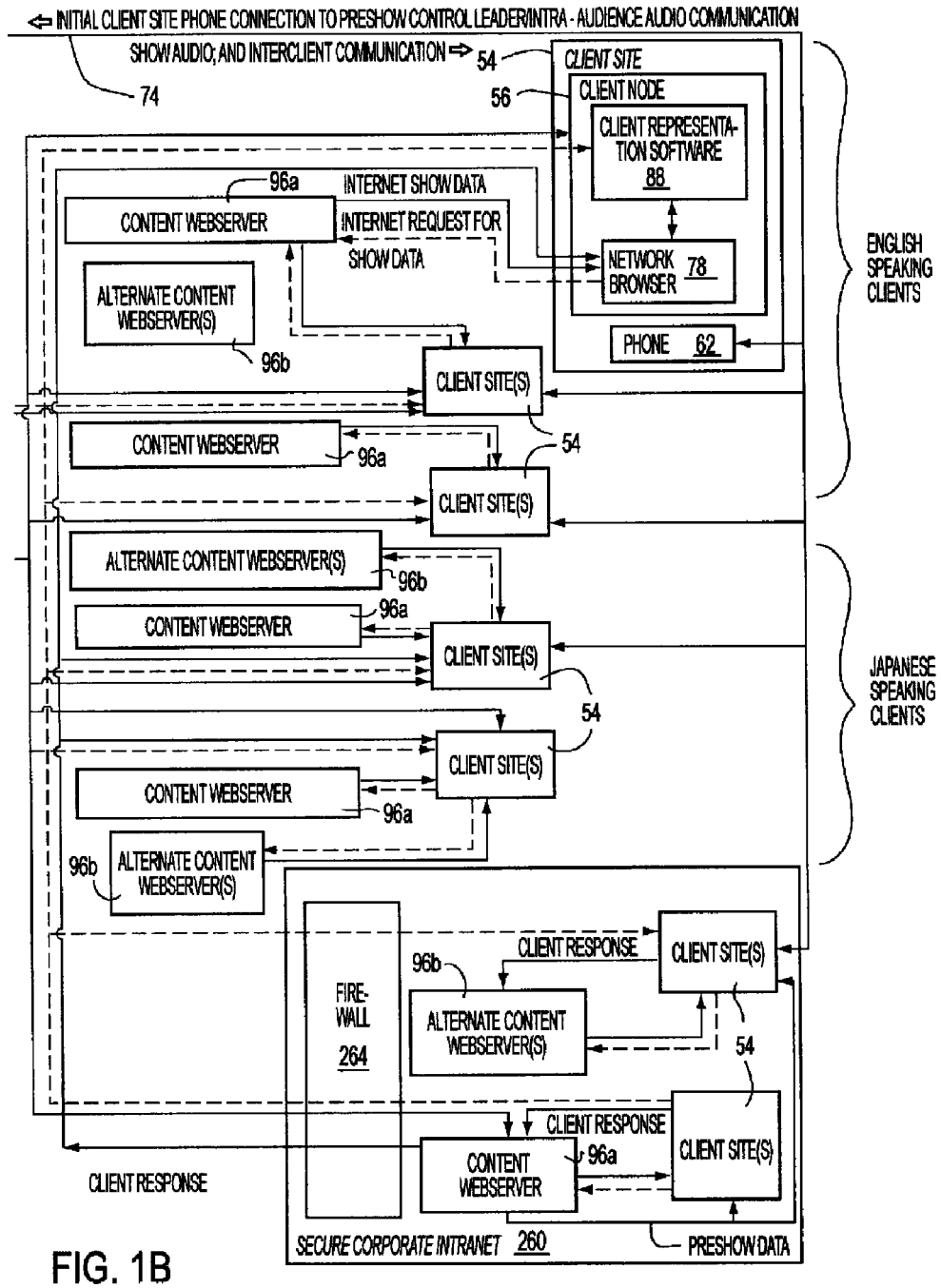
Figure 2A:
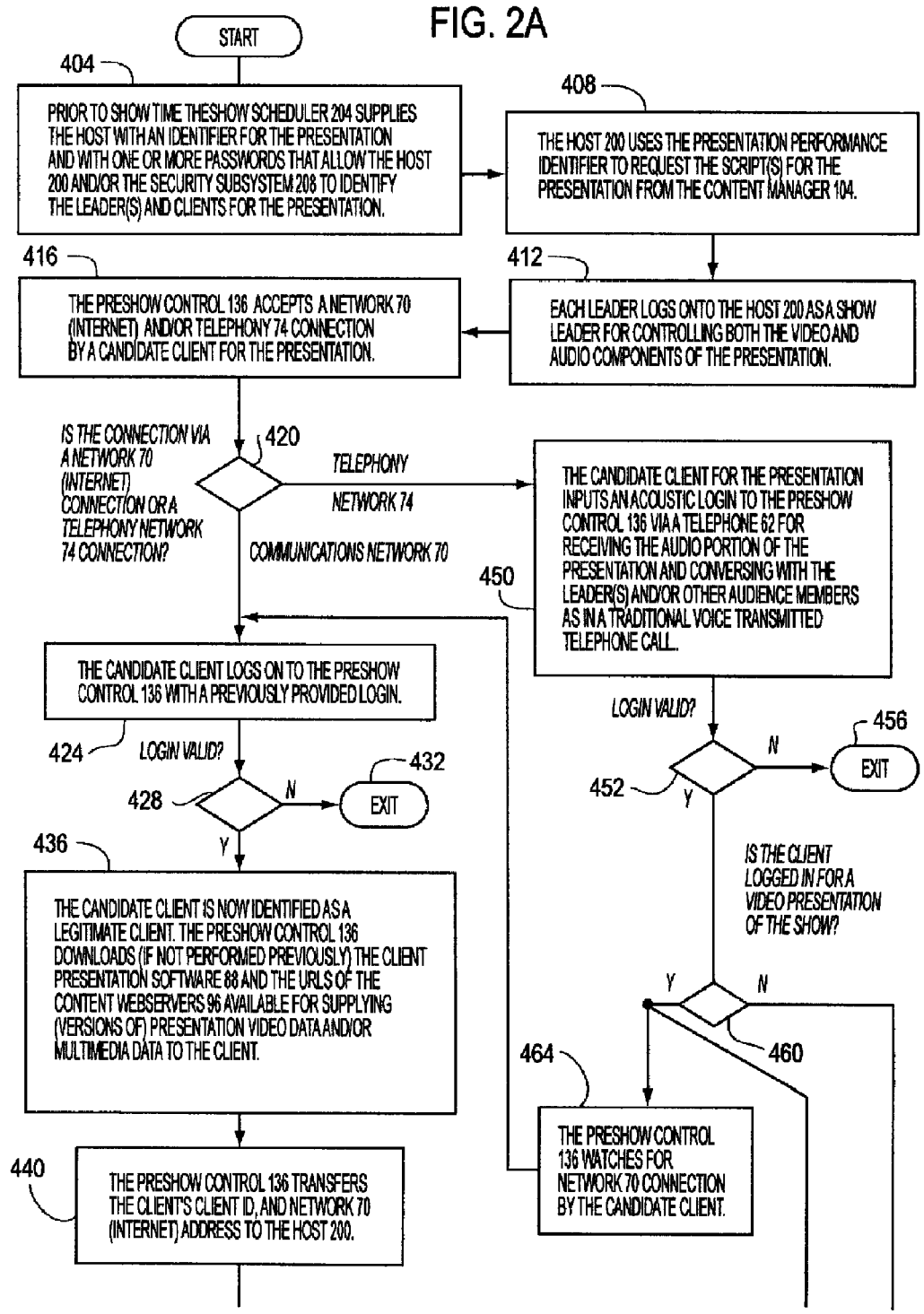
FIGS. 2A-2D present a flowchart of the steps performed (by the embodiment of FIGS. 1A and 2B) for presenting a multimedia presentation to a plurality of clients, each at a different client node.
Figure 2B:
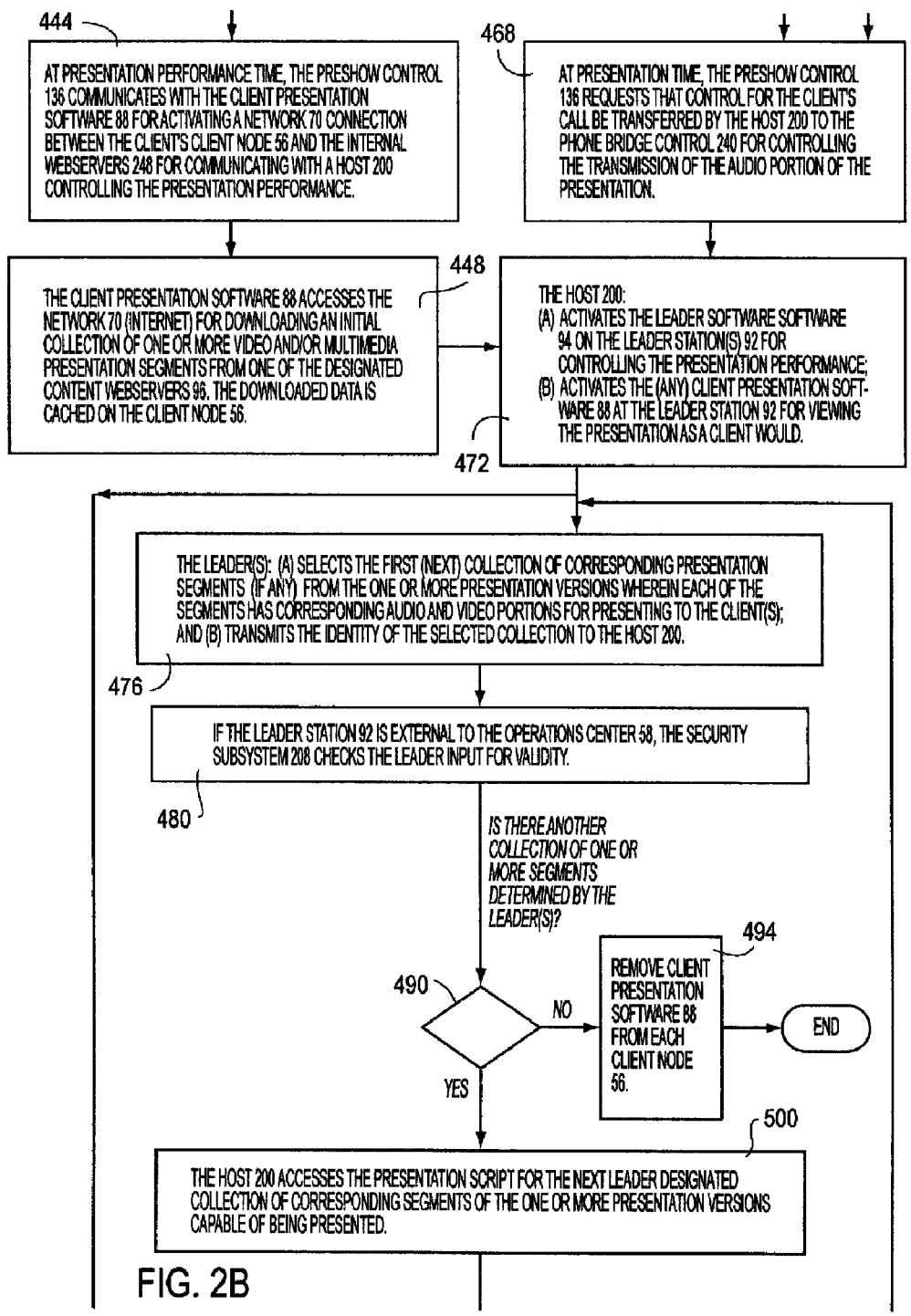
Figure 2C:
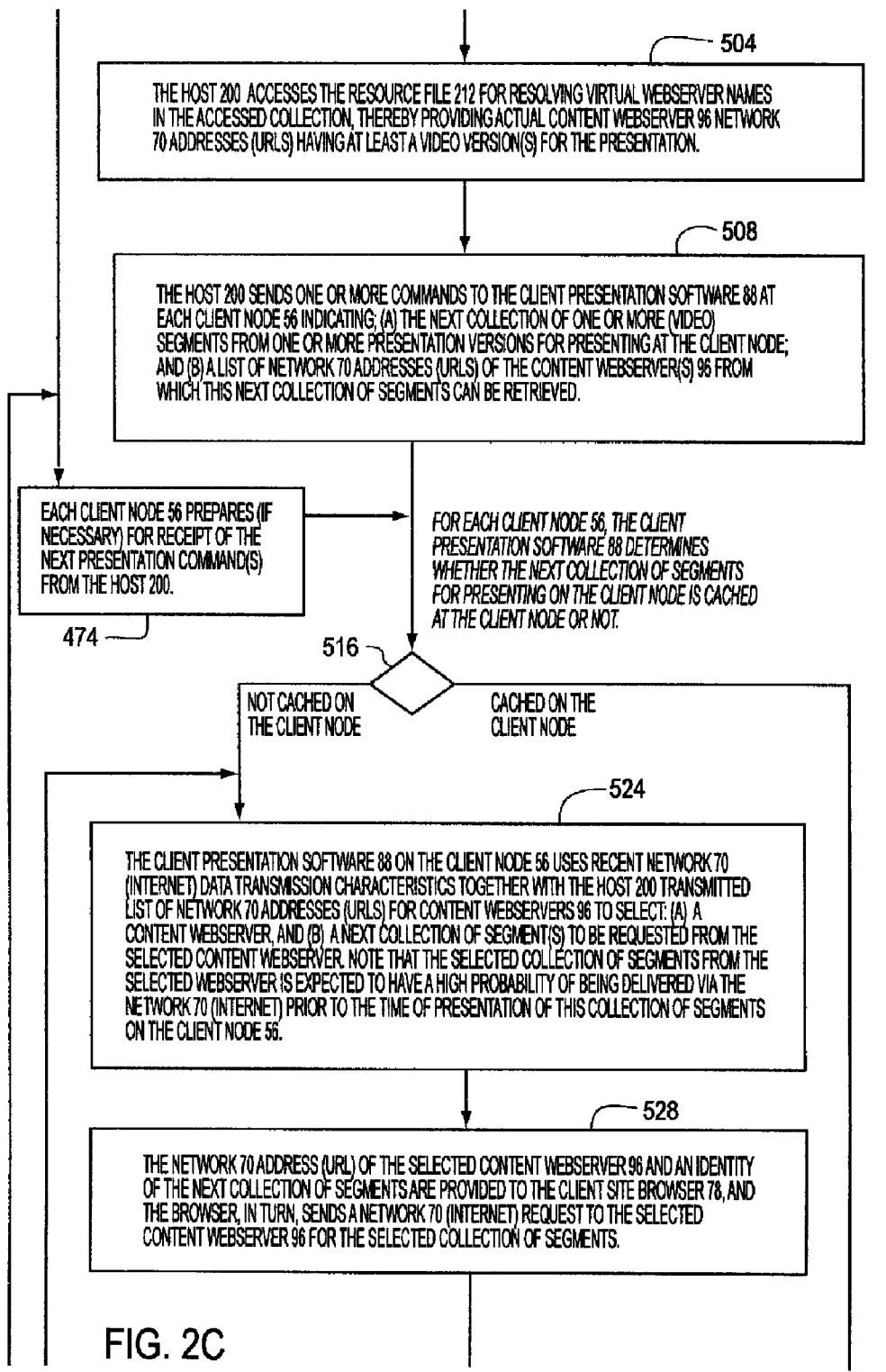
Figure 2D:
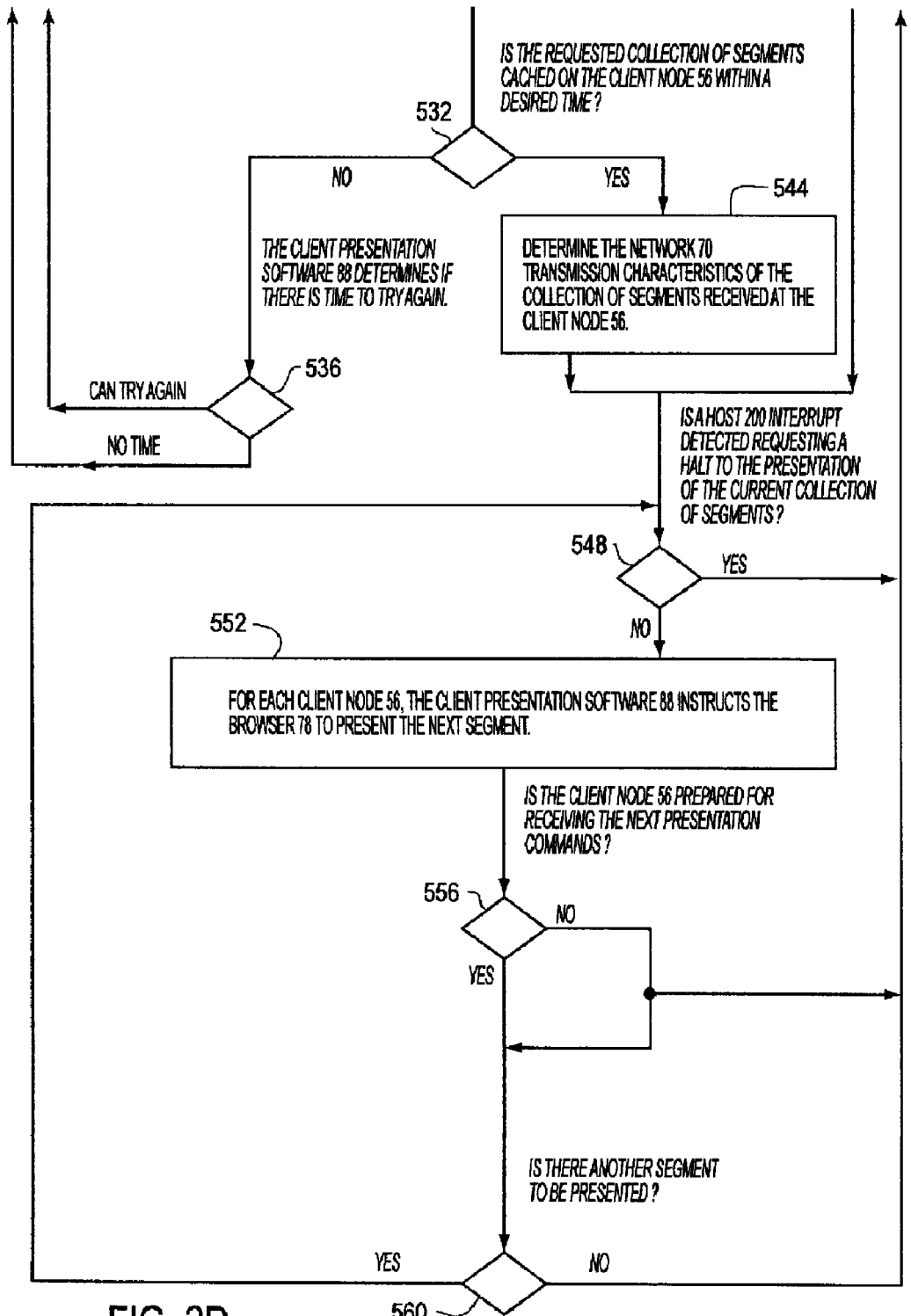
Figure 4:
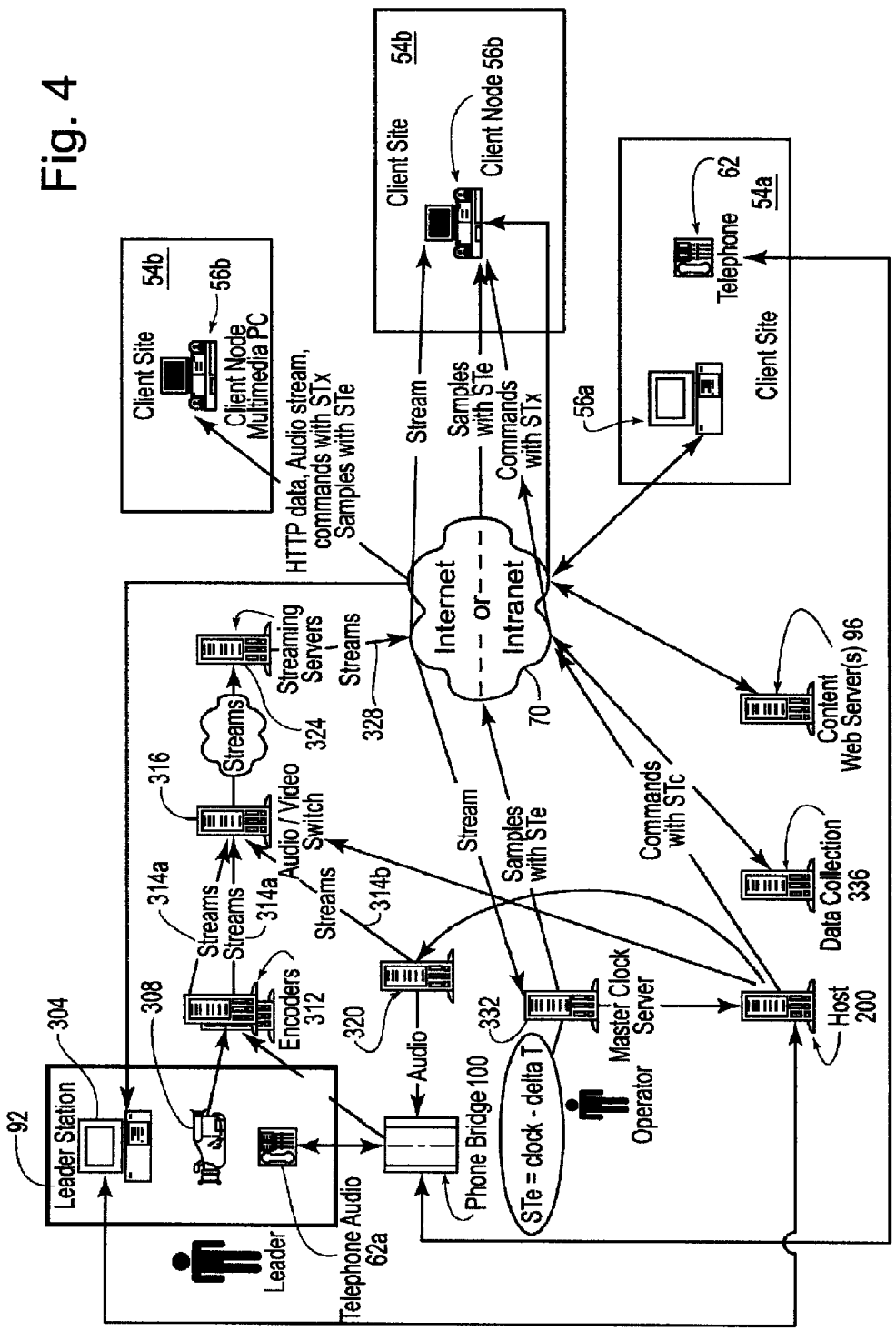
FIG. 4 is a block diagram showing an other embodiment of the present invention, wherein a delayed first portion of a network presentation is provided to multimedia client nodes 56b via a stream 328, and a substantially non-delayed second portion of the network presentation is provided to the multimedia client nodes 56b such that the first and second portions of the presentation are to have their performances synchronized.

Accordingly, referring to FIG. 4, a diagram is provided showing additional components and communication routes utilized by the present invention for providing synchronization between presentation data obtained from different presentation technologies. In particular, FIG. 4 illustrates this aspect of the present invention in the context of the near real-time http/html presentation content provided by the content webservers 96 and the more delayed content of streaming data showing the leader performing the presentation. Components having functionality corresponding to components described hereinabove are identically labeled with the exception of the client sites 54. In the present figure, there are two versions of client sites 54. A first version, that is substantially identical to the client sites 54 of FIGS. 1A and 1B, is represented as client site 54a. Accordingly, such client sites 54a have: (a) client nodes 56a that are substantially only capable of receiving presentation content from the content webservers 96, and (b) a telephone 62 for receiving an audio portion of the presentation. Thus, since the presentation data from each of these two sources is typically presented to audience members in near real-time, the synchronization problems discussed above are, in general, not excessive. However, for a second version of client sites 54b that have a client node 56b that is capable of receiving multimedia streaming audio and video as well, the above described synchronization problems can be manifested.

FIG. 4 will now be described. The components of the leader station 92 include a presentation control station 304 by which the leader: (a) provides presentation commands to the host 200 (and/or subordinate hosts 210), and (b) views the presentation as if he/she were an audience member. Additionally, the leader station 92 includes a telephone console (or telephony station) 62a which may be substantially identical to a telephone 62 at a client site 54a. Moreover, the leader station 92 includes an audio/video recorder 308 for recording the audio and/or video performance of the leader during the presentation and transmitting the resulting audio/video data to one or more encoders 312 that each encode their corresponding audio and/or video input into a stream (denoted herein as an "input stream" 314a). Thus, each such input stream 314a has either combined audio/video content, or, e.g., only an audio content. Note also that the telephone input from, e.g., the leader and/or an audience member can also be input into the encoders 312 via the phone bridge 100 and thereby such input can also be incorporated into one of the input streams 314a. In a very simple embodiment of the present invention, there may be only one input stream 314a (and no input stream 314b). In such an embodiment, the input stream 314a can be transmitted directly to the streaming servers 324 which, in turn, multiplex the stream data in bursts (via stream 328) to, e.g., the client nodes 56b. However, the embodiment illustrated in FIG. 4, is a more sophisticated embodiment. That is, there are multiple input streams 314a and/or 314b, wherein the input streams 314b are output by the file server 320 for providing, e.g., a pre/post presentation audio and/or video stream that has been prerecorded for audience members to experience prior to commencement of the presentation and/or after completion of the presentation. In particular, the file server 320 initiates and terminates broadcasts of such prerecorded input streams 314b according to commands received by the file server 320 from the host 200 requesting commencement and/or termination of each such broadcasts. Accordingly, this more sophisticated embodiment includes an audio/video switch 316 that determines from these input streams 314a and/or 314b which of them, at any given time (during the presentation), and what portion (if any) of each of them will subsequently be provided to the streaming servers 324 for distribution (via stream 328) to, e.g., the client nodes 56b. The, the audio/video switch 316 switches between its various input data streams 314a and 314b in response to commands provided by, e.g., the leader via host 200. Thus, for example, a leader may commence the presentation performance by instructing the host 200 to direct: (a) the file server 320 to cease providing input to the audio/video switch 316, and/or (b) the audio/video switch 316 to cease outputting any stream data from the file server 320. As an aside, note that the leader can instruct the file server 320 (via the host 200) to input, e.g., background music and/or video upon which the presentation stream data from one or more of the streams 314a can be overlaid as one skilled in the art will understand. Also note that the file server 320 provides corresponding pre-presentation and/or background audio to the phone bridge 100 for providing to client sites 54a via a telephone 62 at such client sites.

Returning to the audio/video switch 316, at least some of the input streams 314a may originate from different users (e.g., leaders), wherein such users are sufficiently geographically dispersed (potentially worldwide) so that distinct corresponding input streams 314a are at least expedient if not substantially unavoidable. Thus, the audio/video switch 316 is the component of the present invention that provides the gateway for allowing one or more of the streams 314a and 314b to be output (via one or more streaming servers 324) to the client sites 54b.

In many presentations, the timing of the multiple input streams 314a and 314b must be synchronized by the audio/video switch 316. As an example of the need for such synchronization, consider the following scenario: assume that a first input stream 314a is received at the audio/video switch 316 from, e.g., a real time performance by a first leader, with a two second delay from real time for data in the first input stream to reach the audio/video switch 316, and a second input stream 314a is received by the audio/video switch 316 from, e.g., a real time performance by a second leader, with an eight second delay for data in the second input stream to reach the switch 316. Further assume that during the presentation the first leader indicates (via the first input stream 314a) to the audience members at client sites 54b, that the second leader is to continue the presentation, and substantially concurrently, the first leader transmits a command (via the host 200) to the switch 316 terminate outputting the contents of the first input stream and commence outputting the contents of the second input stream. Since such commands can be performed in near real time (e.g., within one to two seconds) at the audio/video switch 316, without a synchronizing of the timing of the first and second input streams 314a, the output from the audio/video switch 316 after such a stream switch would insert into the presentation the stream audio video from the second input stream 314a that was transmitted for approximately six seconds prior to the issuance of the command by the first leader for switching to the second leader. This, of course, could produce awkward and potentially embarrassing situations for the second leader. Accordingly, it is desirable and an aspect of the present invention to synchronize the input streams 314a and 314b (once received at the audio/video switch 316) so that the output of the audio/video switch 316 accurately reflects the real time events of the presentation without extraneous events being unintendedly inserted or deleted from the presentation. Thus, the audio/video switch 316 includes stream buffers (not shown) for delaying output from the faster input streams 314a and 313b. More precisely, let $S_0$ denote an input stream with the longest delay from origination of the input streams of a collection of two or more input streams 314a and 314b. Further, assume that there is corresponding content that originates substantially concurrently in each input stream of the collection, and that such content from each input stream must be synchronized to thereby provide an accurate performance of presentation events as they took place in real time. Thus, for every such input stream $S_i$ except $S_0$, $S_i$ is buffered at the audio/video switch 316 so that any content of the stream output from the switch 316 that is obtained from $S_i$ is delayed to provide the intended synchronization with the contents from $S_0$. That is, the audio/video switch 316 creates purposeful delay in all input streams $S_i$ so that output from the switch 316 obtained from any of the input streams 314a and 314b has substantially the same stream delay between origination of the stream and any resulting stream output from the switch 316.

To provide uniform input stream delays from each stream's origination, the switch 316 must be provided with each input stream's delay to the switch 316. The determination of such stream delays is discussed hereinbelow. Additionally note that when the input streams 314a and 314b have the same format, the same (if any) video display width and height, the same number of bits per pixel, the same pixel density, color depth and digital encoding method, then the audio/video switch 316 does not need to fully decode the input streams in order to switch between the input streams. Instead, the switch 316 can merely unwrap the TCP/IP (or UDP) layers and the application transport layers of data in the input streams to modify the stream display time therein. Thus, the switch 316 can process large numbers of input streams 314 for one or more presentations performances concurrently.

When the audio/video switch 316 outputs selected and/or combined input stream data through stream 328 to one or more of the streaming servers 324, these servers 324 transmit the streams to client sites 54b via the network 70 which is, e.g., the Internet and/or an intranet, wherein the network 324 addresses of the streaming servers 324 have been supplied to the client nodes 56 by the host 200. The streaming servers 324 also output their streams to a master clock server 332 (also denoted MC herein) for rendering at least the stream portion of the presentation, and in doing so also determines synchronization timing values for the client nodes 56b and the host 200. In particular, the master clock server 332 uses the stream output to determine timing values, from a synchronization clock at the MC, wherein the timing values are used to synchronize the various differently sourced portions of the presentation at each of the client nodes 54a and 54b. Moreover, the MC 332 determines a series of distinctive (preferably audio) portions (each portion denoted SAS hereinbelow) of the stream input portion of the presentation, and, with each distinctive portion SAS determined, the MC associates a timing value $STe_{(SAS)}$, in synchronization clock time (also denoted MC time herein), that approximates the actual time (also denoted "stream time") when SAS was initially created or originated. The MC 332 transmits to each client node 56 both data for identifying each distinctive portion SAS together with its associated timing value STe via the network 70. The MC 332 also transmits timing values STc (in MC time) to the host 200. The timing values STc are used by the host 200 to provide timing values (in MC time) for each host command subsequently transmitted to the client nodes 56a and 56b so that the presentation portions identified by the host commands can have their performance synchronized with the performance of the stream portions of presentation.

FIG. 4 also illustrates that the present invention may also include a data collection component 336. The data collection component 336 receives audience responses to a presentation, such as feedback regarding the quality of the presentation and responses to questions presented during a presentation. Note that for some responses, each audience member may be allowed no more than a predetermined amount of time to respond to a question. Thus, if a presentation leader desires to show the results from such responses to the audience members, it is preferable that the leader know approximately how long he/she will need to wait before presenting the results. Accordingly, the wait may be approximately determined by the STe timing value. For example, 3*STe plus the time audience members are given to answer the question should, in general, be sufficient time for every audience member that is continuously connected for responding to the question to respond. Alternatively, each client node 56b may be instructed to supply its presentation time delay one or more times to the host 200 in response host commands transmitted to the client nodes 56b. Accordingly, the host 200 may then determine various statistics regarding the presentation delays such as maximum delay time, mean delay time, fluctuation in delay time, and delay time as a function of the number of audience members.

Figure 5:
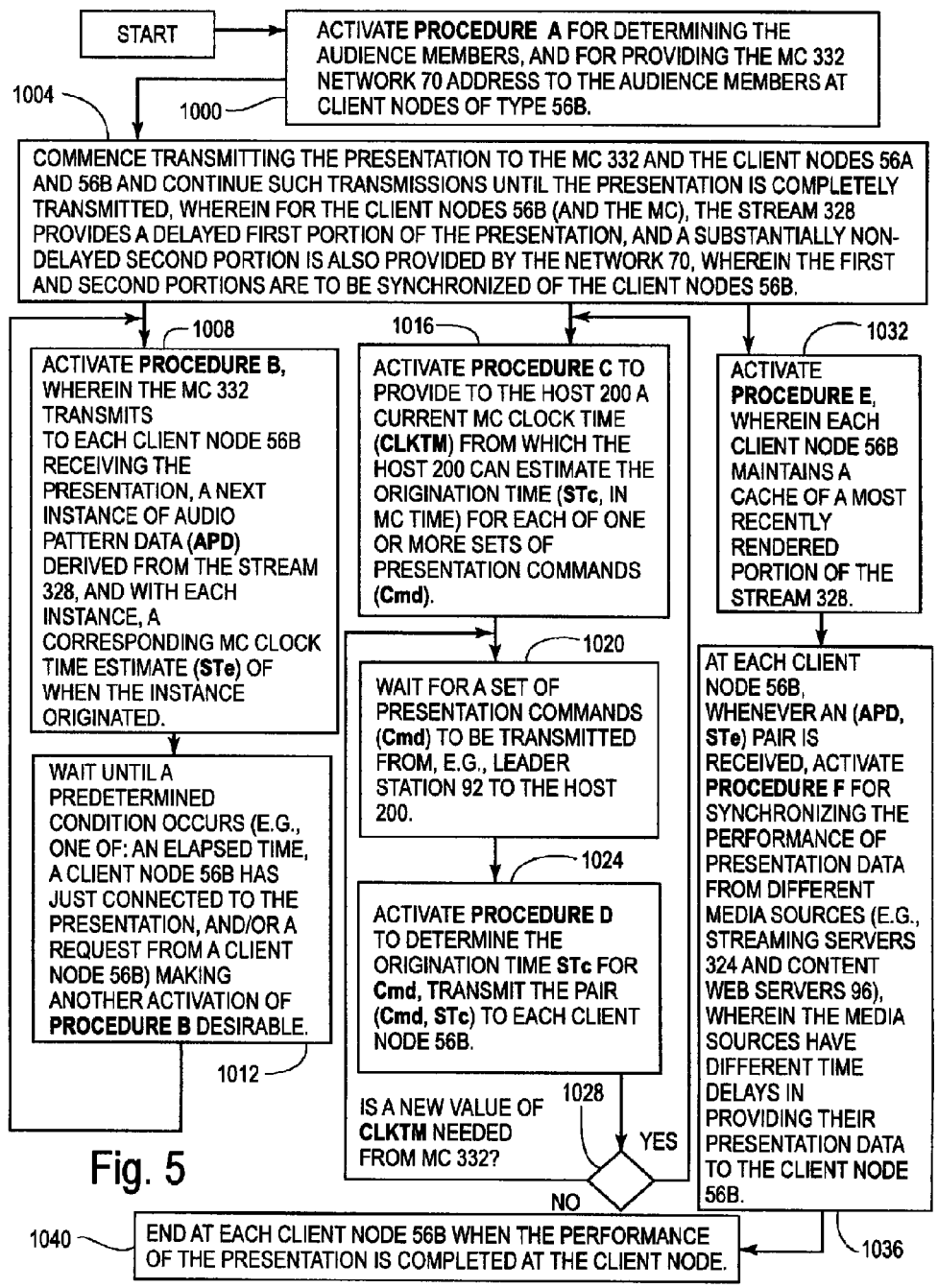
FIG. 5 is a high level flowchart showing the steps performed by the embodiment of the present invention shown in FIG. 4 to accomplish the synchronization at client nodes 56b of a delayed first portion of a network presentation provided via stream 328 with the substantially non-delayed second portion of the network presentation.

FIG. 5 is a flowchart of the high level steps performed by the embodiment of the present invention shown in FIG. 4 for synchronizing the performance of portions of a presentation, wherein these presentation portions have different time delay characteristics from their respective originations when they are received at a client node 56b. For instance, a first presentation portion maybe received at a client node 56b via stream 328, and a second presentation portion maybe received at the client node 56b from a content webserver 96 in a manner substantially similar to what has been described with respect to FIGS. 1-3. It is believed that the flowchart of FIG. 5 is substantially self explanatory in view of the above description of FIG. 4 and in view of the description given hereinbelow of the procedures referenced in the steps of the flowchart. However, for completeness, a brief description of FIG. 5 is provided. Accordingly, in step 1000, Procedure A (described hereinbelow) is activated to identify and validate the audience members for a network presentation. Note that in at least one embodiment, the description of this step may be substantially similar to the description of step 416 of FIG. 2A. Subsequently, in step 1004 the client nodes 56a and 56b as well as the MC 332 commence receiving the presentation wherein the client nodes 56b and the MC 332 receive at least first and second presentation portions that have different time delay characteristics, but wherein such first and second portions must have their performances synchronized in order to maintain presentation continuity and cohesiveness. In particular, the first portion may be provided by stream 328 and the second portion by content webservers 96. Accordingly, the first portion may be delayed by as much as 30 to 40 seconds from the second portion received from a content webserver 96. Note that such synchronization may require that a sub-portion $s_1$ of the first presentation portion must be presented concurrently on the client nodes 56b with a particular sub-portion $s_2$ of the second presentation portion. Alternatively, such synchronization may require that $s_1$ smoothly follow $s_2$. Moreover, note that once network 70 transmissions for a presentation commence, it may be difficult to control when one or more of the presentation portions arrive at each of the client nodes 56b. For example, when the first presentation portion is transmitted via stream 328 from a live performance at a leader station 92, such transmissions are likely to be continuous throughout the presentation even though they must be synchronized with displays of, e.g., slides, websites, video clips, and/or other streams (audio or video).

Following the commencement of presentation network transmissions of step 1004, the three sequences of steps: (a) 1008-1012, (b) 1016-1028, and (c) 1032-1040 are performed roughly in parallel. The sequence (a) describes the processing performed by the MC 332 in deriving synchronization information (i.e., the pair (ADP, STe) described in the discussion of Procedure B hereinbelow) that can be used in synchronizing the (more delayed) first presentation portion received via the stream 328 with the (less delayed) second portion of the presentation provided by, e.g., the content webservers 96. The sequence (b) describes the processing performed by the host 200 (in conjunction with the MC 332) for deriving a timing value (i.e., STc described in the discussion of Procedure D hereinbelow) to be transmitted from the host to the client nodes 56b with each set of presentation commands specifying the performance of various near real-time portions of the presentation wherein the timing value is an estimate of the origination time for a corresponding set of presentation commands, and importantly the timing value is comparable with other timing values at the client nodes 56b. As an aside, note that the processing at the client nodes 56b of such commands is described in steps 508-560 of FIGS. 2C and 2D. When instances of both the synchronization information from sequence (a), and a set of presentation commands (with timing value) from sequence (b) are received at a client node 56b, the sequence (c) describes the process performed at the client node for synchronizing the stream 328 performance with the performance from, e.g., the content webservers 96.

Note that it is within the scope of the present invention that additional sequences of steps, such as the sequences (a) and (b) above, may also be provided for synchronizing additional portions of a network presentation obtained from other presentation data sources and/or having timing characteristics (e.g., time delay, or time delay fluctuation) different from either of the first and second presentation portions discussed thus far. Accordingly, some embodiments of the present invention may synchronize two or more streams with (non-stream) presentation portions obtained from, e.g., content webservers 96.

The description of the Procedures A, B, C, D, E, and F referenced in FIG. 5 are now provided to thereby describe in more detail the processing performed in the steps of this figure.

Procedure A: Determine the audience members for a presentation.

A.1 (step) Each user (i.e., audience member) at a client site 54a or 54b transmits a network 70 request to participate in a presentation to be provided by the present invention, and assuming the network 70 address the user's client node 56a or 56b is determined to be eligible for presentation transmissions, the preshow control 136 (FIG. 1A) transfers to the host 200 the following: (a) user identification, (b) the user's client node network 70 address, and (c) whether the user's client node is of type 65a or 56b. Note that this is substantially steps 436 and 440 of FIG. 2A as applied to the aggregate of all audience members for the presentation.

A.2 (step) For users at client nodes 56b, the host 200 transmits the master clock server 332 network 70 address to the client nodes 56b upon which the presentation is to be presented.

PROCEDURE B: Transmit presentation synchronization timing data from the MC 332 to other network 70 components.

B.1 (step) After presentation startup overhead (e.g., host 200 determining audience member and/or leader eligibility, etc), assume at least one stream from the streaming servers 324 has audio data therein for providing a portion of the presentation, and this audio data is to be presented concurrently with non-stream presentation data from, e.g., the content servers 96 and/or other presentation designated websites. Then the master clock server 332 (MC) commences transmitting presentation related timing data to the host 200, and also to each client node 56b; in particular, the following substeps are performed:

B.1.1 (substep) For transmissions from MC 332 to each client node 56b perform the following sub-substeps (B.1.1.1) and (B.1.1.2) approximately every 5 to 60 seconds depending on, e.g., new presentation participants connecting to the host 200 during the presentation, and more preferably only on demand by a client node 56b:

B.1.1.1 (sub-substep) Determine audio pattern data (APD) indicative of a distinctive audio sample from the stream and transmit it to each client node 56b, wherein each distinctive audio sample is determined by the MC 332 as follows:

Within a cached audio portion (CAP) of the stream that is cached on the MC 332 after presentation at MC, identify the audio samples for approximately 15 seconds of the cached stream. In particular, for the most recently played/rendered audio portion (MRP) in CAP, determine a stream time window (W), wherein W may extend from about 18 sec (stream time) prior to MRP to about 3 sec (stream time) prior to MRP;

For each audio sample in window W determine a "normalized" corresponding value from a predetermined numerical range that can be easily computed. For example, the predetermined range may be from 0 to 255, wherein for each audio sample, its normalized value is determined by converting the sample to an 8 bit byte representation with one byte per frequency modulation value. Note that this normalization is advantageous since many audio data formats already provide audio data in an 8 bit byte representation with one byte per frequency modulation value. Thus, such values may be merely reinterpreted as numbers rather than audio data. Let N(W) denote the normalized values for the samples of W;

Find at least one distinguished audio value within N(W) such as the lowest numeric value (V) for the audio samples within N(W); note that this distinguished value may be a "spike" or "outlier" in N(W). For example such a spike or outlier may be the largest (smallest) value after a series of values lower (higher) than a predetermined threshold, or a value having a largest change in value from an adjacent normalized value;

If V corresponds to more than one audio sample (P) in W, then determine from the set of all samples P of W, the subset, SW, wherein for each of the samples P in W, P is in SW if and only if the value of the next audio sample in CAP (after P)>=all other values of next audio samples following any other P in W. If there is more than one sample P in SW, then choose as a sample "start point" (SP) the earliest sample P of SW closest to the midpoint of W;

Determine the distinctive audio sample as a series of audio samples (SAS) from CAP, wherein the series of audio samples SAS start with SP and continue with the next 15 subsequent such samples that are spaced apart by 1/400 sec;

Obtain the audio pattern data (APD) by normalizing (to a predetermined range, e.g., [0, 1]) the series of audio samples of SAS into 8-bit monaural;

Perform the following two substeps: (i) go to step (a) to determine a next instance of audio pattern data.

B.1.1.2 (sub-substep) Transmit each instance APD of to each client node 56b (i.e., within a range of about 3 sec to 25 sec after determination and preferably approximately no more than 15 sec). Also, concurrently transmit to each client node 56b, the stream clock time STe, in MC-time, corresponding to the origination of SP in the stream. In particular, STe corresponds to the time when the start point SP was originated; i.e., the time when STe was: (i) generated by the stream encoders 312 (for streams generated in real time), or (ii) read from the file server 324 (for prestored streams). Note that when transmitting each APD and its corresponding STe to each of the client nodes 56b participating in a presentation, the present invention may provide such transmissions according to a particular ordering. For example, to assure that each client node 56b is provided periodically with very timely input from the MC 332, the MC may commence the transmission of each (APD, STe) pair at a different portion of the client node 56b list of participants. Thus, in one embodiment, for each successive (APD, STe) pair for transmission, the pointer into the client node 56b transmission list is advanced by 10% of the client nodes 56b listed in a round robin fashion. Accordingly, each client node 56b is assured of receiving at least one timely MC response every $10^{th}$ MC transmission.

Moreover, note that other strategies are also within the scope of the present invention. For instance, there may be especially timely transmissions to certain client nodes 56b that transmit messages to the MC 332 indicating that portions of their presentation are unsynchronized. Also, if the MC 332 is alerted (directly from a client node 56b or via the host 200) that a particular client node 56b has just (re)connected to the presentation, then such a client node may have the next (APD, STe) more timely transmitted to it than would otherwise be the case. Additionally, note that the frequency with which (APD, STe) pairs are determined by the MC 332 may be dynamically determined depending the number of requests to transmit such synchronization data. Thus, at the beginning of a presentation when a large number of client nodes 56b may be connecting to a presentation, such (APD, STe) pairs may be transmitted in a range of 3 to 5 seconds to initial client node 56b presentation connections.

Note that STe may be determined according to the following steps (i) through (iv):

In one embodiment, an operator at MC 332 determines and manually enters a total elapsed time (Tm) that is presumed to be an approximate and substantially uniform time of the delay caused by all stream processing performed during the presentation. In particular, Tm can be determined empirically for a stream by an MC 332 operator. For example, the operator may view two portions of a presentation (or, of a setup test for a presentation), wherein the two portion are known to have occurred concurrently in real time. In particular, the two presentation portion may be: (1) a first such portion received and presented at the MC 332 from a (non-stream) medium providing a near real time rendering at the MC (e.g., from a presentation content supplying node 96 or a phone bridge 100), and (2) a second presentation portion received and rendered at the MC 332 via the more delayed medium of a stream. Thus, since the operator knows that the two such portions of the presentation are supposed to be presented concurrently, then he/she can adjust the value of Tm until they are rendered concurrently at the MC. Accordingly, assuming the time delay in the rendering at MC 332 of the first presentation portion is negligible, Tm is an effective approximation of the delay between stream origination and stream presentation at MC.

The start time (Ts) identifying when SP was rendered at MC 332, in MC-time, is determined;

STe is determined as Ts−Tm.

In an alternative embodiment, Tm can be determined substantially automatically. For example, during preparation prior to a presentation, a distinctive audio sample from each location (L) providing a portion of the presentation may be routed to the MC 332: (i) by a near real time medium such as a phone bridge 100, and (ii) by a delayed presentation medium such as a stream. Accordingly, for each location L, the corresponding distinctive audio sample is timestamped when it is received at the MC 332 by (i) and (ii). For instance, a tone may be generated on the phone bridge 100 for location L, and then the MC 332 may look for the corresponding tone or DTMF sequence and match the tone to a corresponding tone or sequence found in the delayed presentation medium received at the MC. Accordingly, for each location L and a slower presentation medium (S) transmitting presentation data from L, the total elapsed time delay, $Tm_{(L,S)}$, caused by the slower presentation medium S can be determined as a difference in the timestamps.

Additionally, note that if there is a plurality of presentation locations L and/or a plurality of delayed presentation transmissions, a composite or total elapsed time Tm for the entire presentation may be determined as the maximum of all $Tm_{(L,S)}$.

PROCEDURE C: For transmissions between the MC 332 and the host 200 perform the following step for determining a current time in MC time:

C.1 (step) Just prior to the host 200 transmitting each set of presentation commands to each client node 56b, the host determines an estimate (STc) of the time when the set of presentation commands originated. This is accomplished by the host 200 requesting the current clock time (CLKTM) from MC 332 for thereby obtaining STc, or, the host computes an approximate timing value for STc using a previously MC obtained CLKTM value obtained for a previous set of presentation commands. Note that since the MC synchronization clock is the reference clock by which all presentation timing is being referenced for synchronizing differently time delayed portions of the presentation, the current MC synchronization clock time is a timing of real time events that can be compared with other MC timed events. Moreover, in many operative embodiments of the present invention, there is a negligible time delay between an actual presentation real time event R (e.g., the changing of a presentation slide in real time by a presentation leader) and the reception of the resulting presentation commands by the host 200, the current MC synchronization clock time CLKTM is an effective time approximation of the real time event R. STc is determined as follows:

Assuming that the transmission time between the MC 332 and the host 200 is negligible, the host may immediately after receiving a set of presentation commands, request CLKTM from the MC 332. Accordingly, once CLKTM is received by the host 200, STc is set to CLKTM;

Note that once the host 200 has received at least one value for CLKTM, then the host can determine a reasonably good approximate value for subsequent values of STc without interrogating the MC 332 for additional CLKTM values. That is, for some initial value $CLKTM_0$ of CLKTM provided by the MC 332, if the host retains a timestamps (Hr), in host time, of $CLKTM_0$, and for each host time (Hx) when a value for STc is subsequently desired, then the host can compute STc as: $CLKTM_0+(Hx-Hr)$;

Note that if an embodiment of the present invention has a potential non-negligible delays in transmissions between the MC 332 and the host 200, then such a delay $D_{MC}$ can also be determined and compensated for. For example, one half of a round trip delay between the MC 332 and the host 200 may serve as an approximation to such a delay D. Accordingly, STc can be computed as: $CLKTM-D_{MC}$ (for (a) above), and $CLKTM_0+(Hx-Hr)-D_{MC}$ (for (b) above).

PROCEDURE D: With each set of presentation commands (Cmd) for transmission from the host 200 to each client node 56b, also transmit from the host 200 to each client node 56b a corresponding current value of STc as an estimate of the real time when the set of presentation commands originated. More precisely, with each set of presentation commands Cmd received from, e.g., the leader station 92, the host 200 substantially immediately (e.g., within one to two seconds) transmits the data pair (Cmd, STc) to each client node 56b.

D.1 (step) If there is negligible time delay between a real time presentation event (e.g., presentation leader action) and the reception, by the host 200, of data indicative of the real time event (e.g., a set of presentation commands), the host may determine the corresponding STc value with the transmission of the presentation commands to each client node 56b as a time approximation of the real time event. If, however, the time delay between such a real time presentation event and the reception by the host 200 of the set of presentation commands is not negligible, then, as above, a delay $D_L$ can be determined and compensated for. For example, one half of a round trip delay between the leader station 92 and the host 200 may serve as an approximation to such a delay D, and STc computed as CLKTM−$D_{MC}$−$D_L$ (for C.1(a) above), and CLKTM$_O$+(Hx−Hr)−$D_{MC}$−$D_L$ (for C.1(b) above).

PROCEDURE E: Concurrently with activations of PROGRAM B, each client node 56b also caches, in a resident cache C, a portion of the stream that has been most recently rendered by the client node 56b. This cached portion of the stream is used for finding the audio sample data corresponding to APD in a (APD, STe) pair transmitted from the MC 332. Note that the size of the cache C may be dependent on the total elapsed time Tm determined at the MC 332. For example, each client node 56b cache may be in the range of Tm/2 to Tm*2.0.

PROCEDURE F: When a pair (Cmd, STc) is received at a client node 56b, perform a synchronization of the stream 328 (delayed) portions of the presentation with other non-stream (near real-time) portions of the presentation at the client node 56b. For each set of presentation commands (Cmd) from the host 200 for performing the near real-time portions of the presentation, therewith is a timing value (Tc), in MC time, indicating, e.g., a time offset from real time (i.e., the time when Cmd originated) of when the presentation portion corresponding to Cmd is to be presented at the client node 56b. Moreover, assume that Tc is a value that does not take into account presentation delays due to the use of streams (or other delayed presentation mediums). That is, Tc is a presentation time unadjusted for network 70 delays such as stream delays. Now when a client node 56b receives (from the MC 332) APD and its corresponding STe, a component of the present invention on each client node 56b determines a timing for the stream 328 at the client node 56b that is analogous to the stream timing determined at MC 332. That is, the start point SP of the audio sample corresponding to APD in the stream cache C at the client node 56b is correlated with STe, wherein STe becomes the stream time for SP on the client node. Such correlation is typically performed by pattern matching APD against a normalized audio data window in the stream cache C. That is, audio stream data in a window $W_C$ (having a range of from, e.g., about 25 sec after being rendered to about 9 sec after being rendered) is normalized in the same manner as the normalization performed at the MC 332 (thereby yielding $NW_C$). Subsequently, this normalized result $NW_C$ is compared with APD for determining an instance of APD in $NW_C$. Note that, in one embodiment, the comparison may commence from substantially the middle of the normalized data for window $W_C$ and proceed in both time directions therefrom in an interleaved manner. If such an instance of APD is determined in $NW_C$, then the corresponding start point SP for the instance's corresponding non-normalized portion in $W_C$ of the audio stream is associated with STe. Subsequently, a stream time offset ($T_{ofst}$) can be determined between SP and the portion of the stream currently being rendered (CR) on the (each) client node 56b by, e.g., computing a stream time difference (in either MC or client node 56b time) such as $T_{ofst}=(T_{CR}-T_{SP})$ assuming $T_{CR}$ is the client node 56b stream clock time for CR, and $T_{SP}$ is the client node 56b stream clock time for SP. Thus, an approximate current stream time (STp), in MC time, for the stream portion being currently rendered on client node 56b can be determined as STp=STe+$T_{ofst}$. Accordingly, STc−STp is an approximation of the delay that is effective for delaying the portion of the presentation specified by the commands Cmd so that the non-stream (i.e., near real-time) presentation portions are synchronized with the more delayed stream 328 presentation portions. That is, if STc−STp is added to Tc, the resulting time value provides the time for the rendering of the non-stream portion of the presentation resulting from the performance of the commands Cmds.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A system, comprising:
   one or more client nodes structured to receive presentation data;
   one or more leader stations structured to generate one or more presentation commands that control content of the presentation data at the one or more client nodes;
   wherein the one or more client nodes are configured to receive the presentation data from one or more content server sites; and
   wherein the presentation data comprises multiple sequentially ordered scripts so that the one or more leader stations can choose to change the scripts using the one or more presentation commands when the presentation data is provided based on user feedback.

2. The presentation system of claim 1, comprising one or more content managers structured to manage the delivery of the presentation data from one or more content archives to the one or more content server sites and verify that the presentation data is operable to being presented at the one or more client nodes via a secure communication system, wherein the one or more content managers include a time generator for outputting at least first and second master timing values for synchronizing a performance of first and second presentation data at the one or more client nodes.

3. The presentation system of claim 2, wherein the one or more content managers include a presentation controller for transmitting presentation control information to the one or more client nodes.

4. The presentation system of claim 3, wherein the presentation control information includes at least one of first information for accessing said first presentation data for performing at the one or more client nodes, and a first time value derived from said first master timing value, wherein said first time value is a time for performing said first presentation data at the first network node.

5. The presentation system of claim 4, further comprising a presentation time determining component at the one or more client nodes for determining a second time value relative to performing at least a portion of said second presentation data at the one or more client nodes, wherein the second time value is determined using the second master timing value.

6. The presentation system of claim 5, further comprising a time delay determining component at the one or more client nodes for determining a time delay between the first time value and a second time value.

7. The presentation system of claim 5, wherein at least one of said first and second presentation data is streamed on the communications network, and the communications network includes a portion of the Internet.

8. The presentation system of claim 1, further comprising a software download and client support system structured to provide presentation enabling software to at least one of the one or more leader stations and the one or more client nodes.

9. The presentation system of claim 8, wherein the presentation enabling software provided to the one or more leader stations enables leaders to control and direct associated presentation performances.

10. The presentation system of claim 1, further comprising a pre-show control system structured to provide audience members at the one or more client nodes with presentation related information for at least one of registering for the presentation and for establishing initial network connections immediately prior to the presentation.

11. A method, comprising:
providing presentation data to one or more client nodes;
controlling content of the presentation data at the one or more client nodes via one or more leader stations by generating one or more presentation commands at the one or more leader stations; and
delivering the presentation data to the one or more client nodes via one or more content server sites, wherein the presentation data comprises multiple sequentially ordered scripts so that the one or more leader stations can choose to change the scripts using the one or more presentation commands when the presentation data is provided based on user feedback.

12. The method of claim 11, further comprising outputting at least first and second master timing values for synchronizing a performance of first and second presentation data at the one or more client nodes.

13. The method of claim 12, further comprising transmitting presentation control information to the one or more client nodes.

14. The method of claim 13, wherein the presentation control information includes at least one of first information for accessing said first presentation data for performing at the one or more client nodes, and a first time value derived from said first master timing value, wherein said first time value is a time for performing said first presentation data at the first network node.

15. The method of claim 14, further comprising determining a second time value relative to performing at least a portion of said second presentation data at the one or more client nodes, wherein the second time value is determined using the second master timing value.

16. The method of claim 15, further comprising determining a time delay between the first time value and a second time value.

17. The method of claim 15, further comprising streaming one of said first and second presentation data on the communications network, wherein the communications network includes a portion of the Internet.

18. A non-transitory computer readable medium having computer-executable instructions for execution by a processing system, the computer-executable instructions for:
delivering a first presentation data and a second presentation data to one or more client nodes; and
synchronizing a performance of the first presentation data and the second presentation data at the one or more client nodes using at least first and second master timing values, wherein the first presentation data and the second presentation data comprises multiple sequentially ordered scripts so that one or more leader stations can choose to change the scripts using one or more presentation commands when the presentation data is provided based on user feedback.

19. The computer readable medium of claim 18, wherein the computer-executable instructions further determine a time delay between the first and second presentation data and use the time delay in synchronizing the performance.

20. The computer readable medium of claim 18, wherein at least one of the first and second presentation data is delivered via streaming on at least a portion of the Internet.

* * * * *